United States Patent
Kanada

(10) Patent No.: US 9,720,938 B2
(45) Date of Patent: Aug. 1, 2017

(54) SIMILAR IMAGE RETRIEVAL DEVICE, METHOD OF OPERATING SIMILAR IMAGE RETRIEVAL DEVICE, AND SIMILAR IMAGE RETRIEVAL PROGRAM

(71) Applicant: FUJIFILM Corporation, Tokyo (JP)

(72) Inventor: Shoji Kanada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 14/807,892

(22) Filed: Jul. 24, 2015

(65) Prior Publication Data
US 2016/0055394 A1 Feb. 25, 2016

(30) Foreign Application Priority Data
Aug. 21, 2014 (JP) .................................. 2014-168818

(51) Int. Cl.
G06T 7/00 (2017.01)
G06K 9/62 (2006.01)
G06F 17/30 (2006.01)

(52) U.S. Cl.
CPC .... *G06F 17/3028* (2013.01); *G06F 17/30277* (2013.01); *G06K 9/627* (2013.01); *G06K 9/6277* (2013.01); *G06T 7/0014* (2013.01); *G06K 2209/05* (2013.01); *G06T 2207/30004* (2013.01)

(58) Field of Classification Search
CPC ........ G06T 7/0014; G06T 2207/30004; G06K 9/627; G06K 9/6277; G06K 2209/05; G06F 17/3028
See application file for complete search history.

(56) References Cited

U.S. PATENT DOCUMENTS

| | | | | |
|---|---|---|---|---|
| 7,298,877 | B1* | 11/2007 | Collins | G01N 23/04 378/1 |
| 2008/0294591 | A1* | 11/2008 | Bredno | G06F 19/345 |
| 2010/0017389 | A1* | 1/2010 | Ogunbona | G06K 9/627 707/E17.03 |
| 2013/0096941 | A1* | 4/2013 | Kanada | G06F 19/3443 705/2 |

FOREIGN PATENT DOCUMENTS

JP 2011-118543 6/2011

OTHER PUBLICATIONS

Hu et al. "A performance evaluation of gradient field hog descriptor for sketch based image retrieval." Computer Vision and Image Understanding 117.7 (2013): 790-806.*

* cited by examiner

*Primary Examiner* — Katrina Fujita
(74) *Attorney, Agent, or Firm* — Jianq Chyun IP Office

(57) ABSTRACT

A feature amount calculation unit 61 calculates a feature amount corresponding to a pattern of a lesion by analyzing an inspection image. A probability calculation unit calculates a first existence probability which is a probability of the pattern of a lesion existing within the inspection image, using a calculation expression. The calculation expression is created in advance by a statistical method on the basis of a relationship between the feature amount and the presence or absence of the pattern of a lesion within an image for learning which is visually determined by a person. A similarity calculation unit calculates a similarity between the inspection image and a case image on the basis of the first existence probability and a second existence probability which is a probability of the pattern of a lesion existing within the case image which is calculated by the statistical method similarly to the first existence probability.

20 Claims, 17 Drawing Sheets

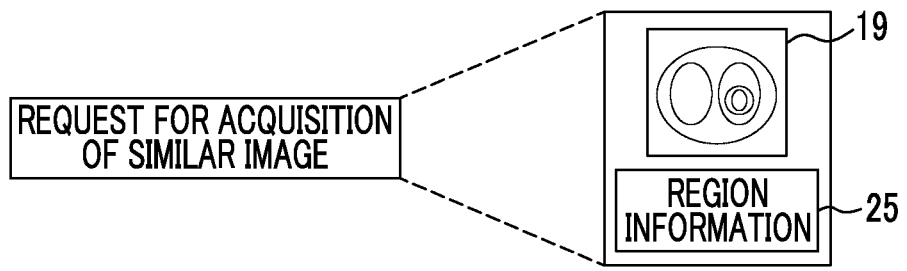
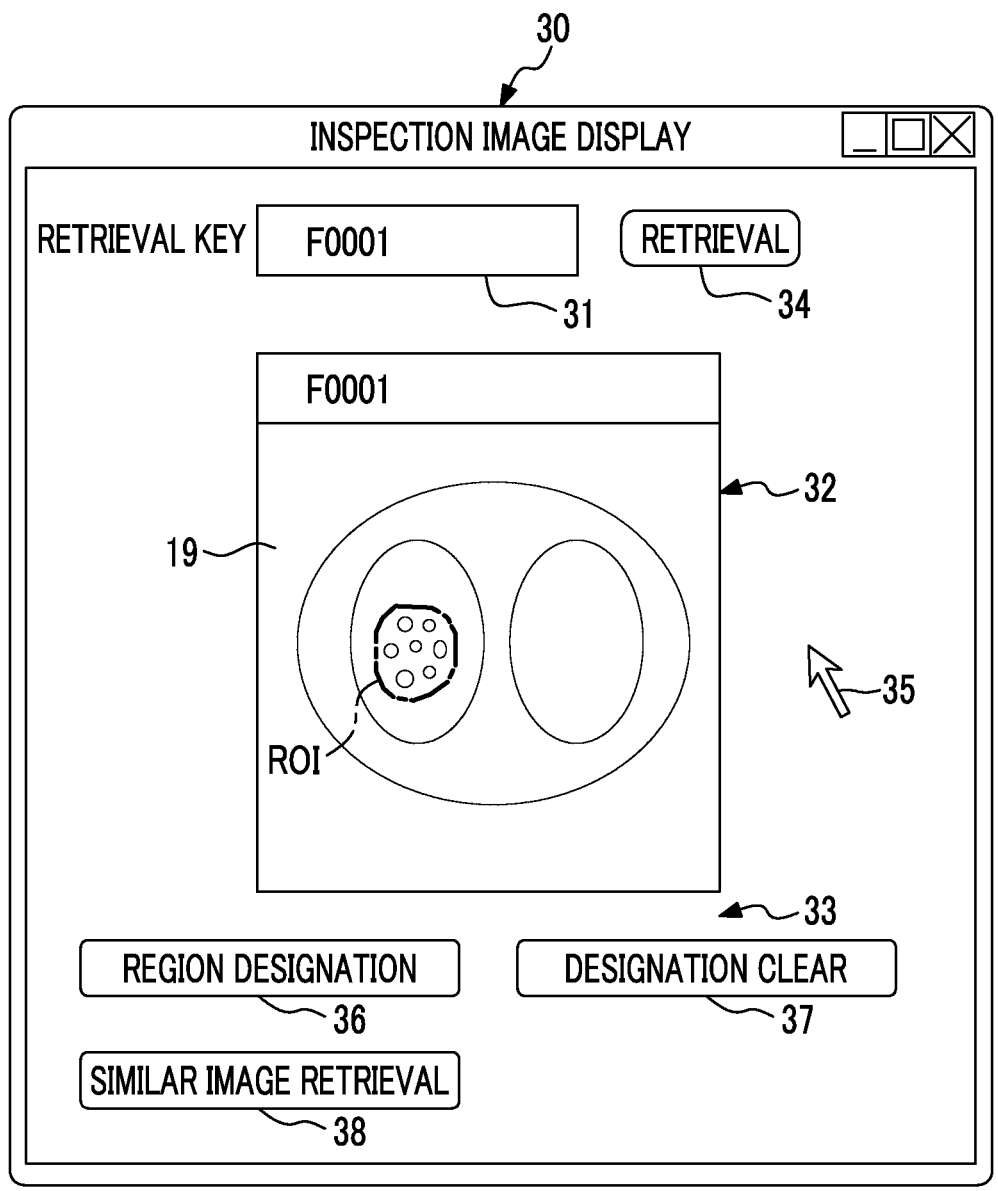

FIG. 8

| FEATURE AMOUNT | PATTERN OF LESION | REMARKS |
|---|---|---|
| FIRST FEATURE AMOUNT ZxA | | ABNORMAL SHADOW OF LOW RESPIRATORY AREA (SUCH AS EMPHYSEMA, PNEUMOTHORAX, OR BULLA) |
| SECOND FEATURE AMOUNT ZxB | | VOMICA |
| THIRD FEATURE AMOUNT ZxC | | ABNORMAL SHADOW OF BRONCHUS (SUCH AS THICKENED BRONCHIAL WALLS, BRONCHIAL DILATATION, TRACTION BRONCHIECTASIS, OR AIR BRONCHOGRAM) |
| FOURTH FEATURE AMOUNT ZxD | | HONEYCOMB LUNG |
| FIFTH FEATURE AMOUNT ZxE | | FROSTED GLASS SHADOW |
| SIXTH FEATURE AMOUNT ZxF | | PUNCTATE SHADOW (SUCH AS NODULAR SHADOW OR TIB) |
| SEVENTH FEATURE AMOUNT ZxG | | ABNORMAL SHADOW OF HIGH ABSORPTION AREA (SUCH AS CONSOLIDATION, NODULE, OR BRONCHIAL MUCOUS GLAND) |
| EIGHTH FEATURE AMOUNT ZxH | | PUNCTATE SHADOW, RETICULAR SHADOW |

FIG. 9

| IMAGE FOR LEARNING | ... | PATTERN OF LESION | | | | ... |
|---|---|---|---|---|---|---|
| | | FROSTED GLASS SHADOW | | PUNCTATE SHADOW | | |
| | ... | PRESENCE OR ABSENCE OF PATTERN | FIFTH FEATURE AMOUNT | PRESENCE OR ABSENCE OF PATTERN | SIXTH FEATURE AMOUNT | ... |
| 1 | ... | X | −1.43 | O | +2.19 | ... |
| 2 | ... | X | −0.74 | X | −0.33 | ... |
| 3 | ... | O | +0.83 | X | −1.47 | ... |
| 4 | ... | O | +1.31 | X | −1.16 | ... |
| 5 | ... | X | −2.04 | X | −1.15 | ... |
| 6 | ... | X | −0.01 | O | +0.25 | ... |
| 7 | ... | X | −0.36 | O | +0.98 | ... |
| 8 | ... | X | −0.17 | O | +3.04 | ... |
| 9 | ... | O | +2.27 | X | −1.16 | ... |
| ⋮ | ⋮ | ⋮ | ⋮ | ⋮ | ⋮ | ⋮ |

LOGISTIC REGRESSION ANALYSIS $$P_{xE} = \frac{1}{1+\exp(-A_{E0}-A_{E1} \times Z_{xE})}$$

$$P_{xF} = \frac{1}{1+\exp(-A_{F0}-A_{F1} \times Z_{xF})}$$

FIG. 13

| ORDER | IMAGE ID | SIMILARITY | ROI IMAGE |
|---|---|---|---|
| 1 | F0044 | 12.56 | |
| 2 | F0108 | 12.29 | |
| 3 | F0021 | 12.26 | |
| 4 | F0504 | 12.18 | |
| 5 | F0219 | 12.04 | |
| ⋮ | ⋮ | ⋮ | ⋮ |

LIST ~67

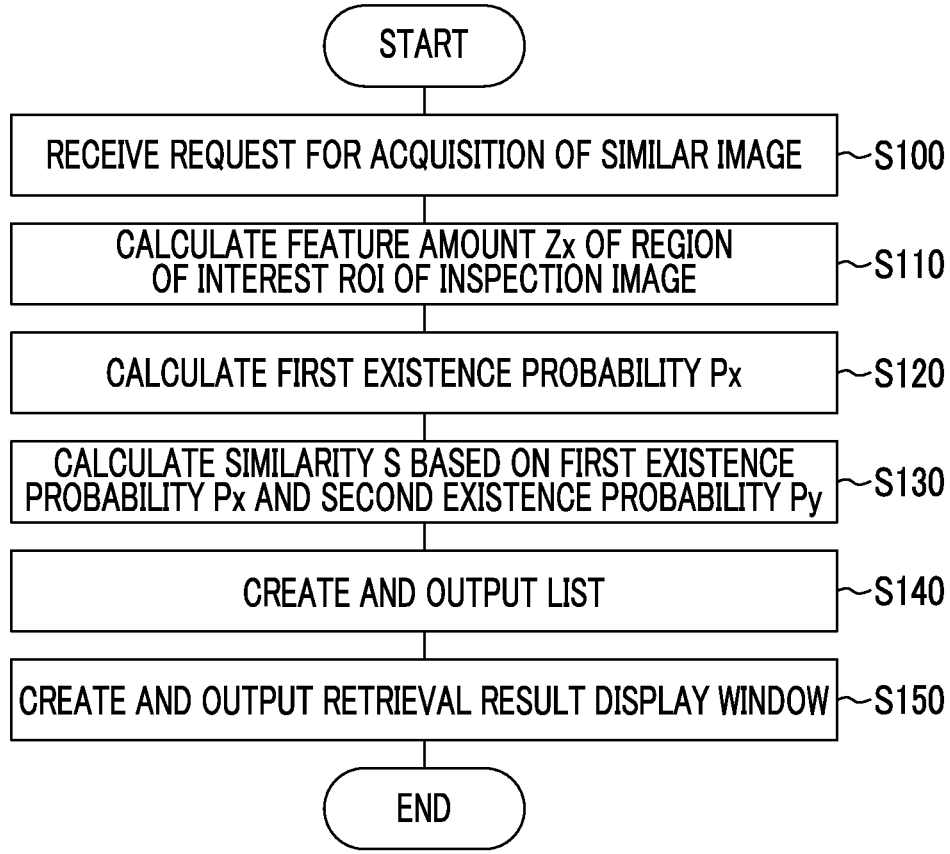
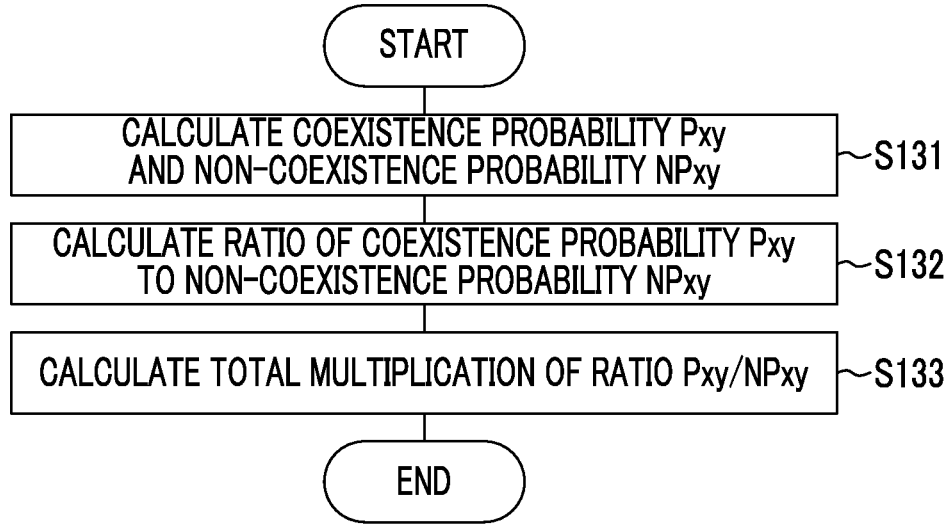

FIG. 17A

| FIRST EXISTENCE PROBABILITY Px | SECOND EXISTENCE PROBABILITY Py | COEXISTENCE PROBABILITY Pxy | SIMILARITY |
|---|---|---|---|
| 0.8 | 1.0 | 0.8 | HIGH ↓ LOW |
|  | 0.9 | 0.72 |  |
|  | 0.8 | 0.64 |  |
|  | 0.7 | 0.56 |  |
|  | 0.6 | 0.48 |  |
|  | ⋮ | ⋮ | ⋮ |

FIG. 17B

| FIRST EXISTENCE PROBABILITY Px | SECOND EXISTENCE PROBABILITY Py | min(Px,Py) | COEXISTENCE PROBABILITY Pxy | SIMILARITY |
|---|---|---|---|---|
| 0.8 | 1.0 | 0.8 | 0.64 | SAME |
|  | 0.9 | 0.8 | 0.64 |  |
|  | 0.8 | 0.8 | 0.64 |  |
|  | 0.7 | 0.7 | 0.56 | HIGH ↓ LOW |
|  | 0.6 | 0.6 | 0.48 |  |
|  | ⋮ | ⋮ | ⋮ |  |

FIG. 18A

| FIRST EXISTENCE PROBABILITY Px | SECOND EXISTENCE PROBABILITY Py | NON-COEXISTENCE PROBABILITY NPxy | SIMILARITY |
|---|---|---|---|
| 0.8 | 1.0 | 0.2 | HIGH ↑ |
|  | 0.9 | 0.26 |  |
|  | 0.8 | 0.32 |  |
|  | 0.7 | 0.38 |  |
|  | 0.6 | 0.44 | ↓ LOW |
|  | ⋮ | ⋮ |  |

FIG. 18B

| FIRST EXISTENCE PROBABILITY Px | SECOND EXISTENCE PROBABILITY Py | min(Px,Py) | NON-COEXISTENCE PROBABILITY NPxy | SIMILARITY |
|---|---|---|---|---|
| 0.8 | 1.0 | 0.8 | 0.36 | LOW ↑ |
|  | 0.9 | 0.8 | 0.34 |  |
|  | 0.8 | 0.8 | 0.32 | HIGH |
|  | 0.7 | 0.7 | 0.38 | ↑ |
|  | 0.6 | 0.6 | 0.44 | LOW |
|  | ⋮ | ⋮ | ⋮ |  |

FIG. 19A

| FIRST EXISTENCE PROBABILITY Px | SECOND EXISTENCE PROBABILITY Py | NON-COEXISTENCE PROBABILITY NPxy | SIMILARITY |
|---|---|---|---|
| | ⋮ | ⋮ | LOW ↑ |
| | 0.5 → | 0.5 | |
| 0.3 | 0.4 → | 0.46 | |
| | 0.3 → | 0.42 | |
| | 0.2 → | 0.38 | |
| | 0.1 → | 0.34 | HIGH |

FIG. 19B

| FIRST EXISTENCE PROBABILITY Px | SECOND EXISTENCE PROBABILITY Py | max(Px,Py) | NON-COEXISTENCE PROBABILITY NPxy | SIMILARITY |
|---|---|---|---|---|
| | ⋮ | ⋮ | ⋮ | LOW ↑ |
| | 0.5 | 0.5 → | 0.5 | |
| 0.3 | 0.4 | 0.4 → | 0.46 | |
| | 0.3 | 0.3 → | 0.42 | HIGH |
| | 0.2 | 0.3 → | 0.45 | ↑ |
| | 0.1 | 0.3 → | 0.48 | LOW |

SIMILAR IMAGE RETRIEVAL DEVICE, METHOD OF OPERATING SIMILAR IMAGE RETRIEVAL DEVICE, AND SIMILAR IMAGE RETRIEVAL PROGRAM

CROSS-REFERENCE TO RELATED APPLICATIONS

The present application claims priority under 35 U.S.C. §119 to Japanese Patent Application No. 2014-168818, filed Aug. 21, 2014, all of which are hereby expressly incorporated by reference into the present application.

BACKGROUND OF THE INVENTION

1. Field of the Invention

The present invention relates to a similar image retrieval device, a method of operating a similar image retrieval device, and a non-transitory computer readable recording medium having a similar image retrieval program recorded thereon.

2. Description of the Related Art

Hitherto, similar image retrieval has been performed in which a similar image which is similar to a retrieved image is retrieved from a plurality of instance images. In the similar image retrieval, a feature amount corresponding to a specific pattern which is taken visual notice of by a person within an image is calculated with respect to the retrieved image and the instance image, and a similarity between the retrieved image and the instance image is determined on the basis of the calculated feature amount. The similar image retrieval is put to great practical use in, particularly, the field of medicine. Specifically, the similar image retrieval is used when a doctor makes a specific diagnosis of a disease on the basis of a lesion which is reflected in an inspection image obtained by radiographing a patient using a CT (Computed tomography) device, an MM (Magnetic Resonance Imaging) device, a general X-ray photography device, or the like.

JP2011-118543 discloses a similar image retrieval device that retrieves a similar image to an inspection image used for a diagnosis in a patient equivalent to a retrieved image from a plurality of past case images equivalent to instance images, through the utilization of similar image retrieval, and provides the retrieved similar image to a doctor.

A lesion which is reflected in an inspection image includes ground-glass opacity, an infiltrative shadow, or a plurality of types such as a honeycomb lung, and a lesion which is reflected in one inspection image is not necessarily one type. In case where there are multiple types of lesion, a doctor needs to identify a subtle difference for each lesion. In addition, since the type of lesion changes with the progression of an illness, a certain amount of experience is required for a doctor to make a diagnosis without any help with only radiographic interpretation of an inspection image. Consequently, as in JP2011-118543, by the utilization of the similar image retrieval, the type of lesion of the inspection image can be specified with a hint of the similar image, and even a less-experienced doctor can make a diagnosis having higher accuracy.

The similar image retrieval device disclosed in JP2011-118543 calculates feature amounts from an inspection image which is a retrieved image and a case image which is an instance image, using various types of lesion as patterns. The feature amounts include multiple types such as things related to a pixel value such as an average, dispersion, a maximum value, a minimum value, or a histogram of a pixel value, things related to a shape such as a position or a contour, and things related to a size such as a radius, a volume, or an area.

In similar image retrieval device disclosed in JP2011-118543, as shown in Expression 1 of paragraph <0050>, each difference |Mi−mi| between multiple types of feature amount Mi (i=1, 2, ..., n) calculated from an inspection image and multiple types of feature amount mi (i=1, 2, ..., n) calculated from a case image is obtained, and a sum (Σwi|Mi−mi|) obtained by multiplying each difference by an appropriate weighting coefficient wi (i=1, 2, ..., n) is calculated as a similarity between the inspection image and the case image.

The similarity calculated in this manner indicates a distance in an n-dimensional vector space of two n-dimensional vectors (often called feature vectors) using each of the feature amounts Mi and mi as an element. It is determined that as the difference between the feature amounts Mi and mi decreases (as a distance between two n-dimensional vectors using each of the feature amounts Mi and mi as an element becomes shorter), the similarity becomes smaller, and that the inspection image and the case image have a high similarity therebetween. On the other hand, it is determined that as the difference between the feature amounts Mi and mi increases (as a distance between two n-dimensional vectors using each of the feature amounts Mi and mi as an element becomes longer), the similarity becomes larger, and that the inspection image and the case image have a low similarity therebetween.

As in the similar image retrieval device disclosed in JP2011-118543, when the similarity between the inspection image and the case image is calculated on the basis of the feature amounts, the reliability of the similarity is dependent on the calculation accuracy of the feature amounts. In addition, since the feature amount is a predetermined numerical value, and is not a value obtained by completely reproducing a human appearance, an estrangement between a human appearance and the similarity calculated on the basis of the feature amounts may occur. Particularly, when the feature amount has multiple types, the calculation accuracy differs depending on the types, and the degree of estrangement from a human appearance also differs depending on the types. For this reason, there is a greater tendency for the reliability of the similarity to be influenced.

Further, as in the similar image retrieval device disclosed in JP2011-118543, during the calculation of the similarity between the inspection image and the case image on the basis of the feature amounts, similarities are the same as each other in case where the feature amounts of the inspection image and the case image are substantially coincident with each other in both large values, and in case where the feature amounts of the inspection image and the case image are substantially coincident with each in both low values.

Generally, a feature amount corresponding to a certain pattern shows that as the value becomes larger, the existence probability of the pattern within an image increases. Therefore, from an object of similar image retrieval to obtain a similar image to an inspection image, a similarity in case where the feature amounts of the inspection image and the case image are substantially coincident with each other in both large values has to be made higher than in case where the feature amounts of the inspection image and the case image are substantially coincident with each other in both low values. However, in JP2011-118543, this point is not considered. Therefore, it is not necessarily possible to retrieve a similar image having a sense of consent.

SUMMARY OF THE INVENTION

The present invention is contrived in view of the above problems, and an object thereof is to provide a similar image retrieval device, a method of operating a similar image retrieval device, and a similar image retrieval program which are reliable and capable of retrieving a similar image having a sense of consent coincident with the similarity of a human appearance.

In order to achieve the above object, according to the present invention, there is provided a similar image retrieval device that retrieves a similar image which is similar to a retrieved image from a plurality of instance images, including: a feature amount calculation unit that calculates a feature amount corresponding to a pattern, registered in advance, by analyzing the retrieved image; a probability calculation unit that calculates a first existence probability of the pattern existing within the retrieved image, through a statistical method, on the basis of the feature amount calculated by the feature amount calculation unit; and a similarity calculation unit that calculates a similarity between the retrieved image and each of the plurality of instance images, on the basis of the first existence probability calculated by the probability calculation unit and a second existence probability of the pattern existing within the instance images which is calculated with respect to the plurality of instance images.

It is preferable that the probability calculation unit uses a calculation expression for calculating the first existence probability, created in advance by the statistical method, using the feature amount as a variable, on the basis of a relationship between the presence or absence of the pattern within an image for learning visually determined by a person and the feature amount.

It is preferable that the similarity calculation unit calculates at least one of a coexistence probability of the pattern existing in both the instance image and the retrieved image, and a non-coexistence probability of the pattern independently existing in only one of the instance image and the retrieved image, on the basis of the first existence probability and the second existence probability.

The similarity calculation unit calculates the coexistence probability or the non-coexistence probability, as the similarity, and determines that a similarity between the instance image and the retrieved image becomes higher as the coexistence probability increases, or determines that a similarity between the instance image and the retrieved image becomes lower as the non-coexistence probability increases.

The similarity calculation unit calculates, for example, a ratio of the coexistence probability to the non-coexistence probability, as the similarity, and determines that a similarity between the instance image and the retrieved image becomes higher as the ratio becomes higher.

In case where the pattern has multiple types, the similarity calculation unit may calculate the coexistence probability or the non-coexistence probability of each of the multiple types of patterns, calculate a total multiplication of the calculated coexistence probabilities or a logarithmic sum of the calculated coexistence probabilities, or a total multiplication of the calculated non-coexistence probabilities or a logarithmic sum of the calculated non-coexistence probabilities, as the similarity, and determine that a similarity between the instance image and the retrieved image becomes higher as the total multiplication of the coexistence probabilities or the logarithmic sum of the coexistence probabilities increases, or determine that a similarity between the instance image and the retrieved image becomes lower as the total multiplication of the non-coexistence probabilities or the logarithmic sum of the non-coexistence probabilities increases.

In addition, in case where the pattern has multiple types, the similarity calculation unit may calculate a ratio of the coexistence probability to the non-coexistence probability of each of the multiple types of patterns, calculates a total multiplication of the calculated ratios or a logarithmic sum of the ratios, as the similarity, and determines that a similarity between the instance image and the retrieved image becomes higher as the total multiplication of the ratios or the logarithmic sum of the ratios increases.

It is preferable that in case where the first existence probability is set to $Px$, the second existence probability is set to $Py$, and the coexistence probability is set to $Pxy$, a relation of $Pxy=Px \times Py$ is established.

It is preferable that in case where the first existence probability is set to $Px$, the second existence probability is set to $Py$, and the non-coexistence probability is set to $NPxy$, a relation of $NPxy=Px \times (1-Py)+(1-Px) \times Py$ is established.

In case where the first existence probability is set to $Px$, the second existence probability is set to $Py$, a minimum value of $Px$ and $Py$ is set to $\min(Px, Py)$, and the coexistence probability is set to $Pxy$, a relation of $Pxy=Px \times \min(Px, Py)$ may be established.

In case where the first existence probability is set to $Px$, the second existence probability is set to $Py$, a minimum value of $Px$ and $Py$ is set to $\min(Px, Py)$, a maximum value of $Px$ and $Py$ is set to $\max(Px, Py)$, and the non-coexistence probability is set to $NPxy$, in case where $Px>0.5$, a relation of $NPxy=Px \times \{1-\min(Px, Py)\}+(1-Px) \times Py$ may be established, and in case where $Px \leq 0.5$, a relation of $NPxy=Px \times (1-Py)+(1-Px) \times \max(Px, Py)$ may be established.

It is preferable to further include a filtering unit that compares an exclusion range of the second existence probability with the second existence probability, and excludes the instance image in which the second existence probability is in the exclusion range, from candidates for calculating the similarity in the similarity calculation unit. It is preferable that the filtering unit calculates the exclusion range from a relational expression between the first existence probability and the second existence probability in which the first existence probability is used as a variable.

The feature amount calculation unit calculates, for example, the feature amount of a region of a portion of the retrieved image.

The feature amount calculation unit may further calculate a feature amount of the instance image. In addition, the probability calculation unit may further calculate the second existence probability.

It is preferable to further include a retrieval result output unit that outputs a set of the similar image and the similarity, as a retrieval result of the similar image. The retrieval result output unit may output a list obtained by sorting a set of a plurality of the similar images and the similarity in order of the similarity.

For example, the retrieved image is an inspection image which is used for a diagnosis in a patient, the instance image is a case image which is the inspection image used for a diagnosis in the past, and the pattern is a pattern of a lesion indicating a symptom of the patient's disease.

According to the present invention, there is provided a method of operating a similar image retrieval device that retrieves a similar image which is similar to a retrieved image from a plurality of instance images, including: a feature amount calculation step of causing a feature amount calculation unit to calculate a feature amount corresponding to a pattern, registered in advance, by analyzing the retrieved image; a probability calculation step of causing a probability calculation unit to calculate a first existence probability of the pattern existing within the retrieved image, through a statistical method, on the basis of the feature amount calculated in the feature amount calculation step; and a similarity calculation step of causing a similarity calculation unit to calculate a similarity between the retrieved image and each of the plurality of instance images, on the basis of the first existence probability calculate in the probability calculation step and a second existence probability of the pattern existing in the instance image which is calculated with respect to the plurality of instance images.

According to the present invention, there is provided a similar image retrieval program for retrieving a similar image which is similar to a retrieved image from a plurality of instance images, the medium causing a computer to execute: a feature amount calculation function of calculating a feature amount corresponding to a pattern, registered in advance, by analyzing the retrieved image; a probability calculation function of calculating a first existence probability of the pattern existing within the retrieved image, through a statistical method, on the basis of the feature amount calculated in the feature amount calculation function; and a similarity calculation function of calculating a similarity between the retrieved image and each of the plurality of instance images, on the basis of the first existence probability calculated in the probability calculation function and a second existence probability of the pattern existing within the instance image which is calculated with respect to the plurality of instance images.

According to the present invention, the first existence probability of a pattern existing in a retrieved image is calculated by a statistical method on the basis of a feature amount, corresponding to the pattern registered in advance, which is obtained by analyzing and calculating the retrieved image, and a similarity between the retrieved image and a plurality of instance images is calculated on the basis of the first existence probability and a second existence probability of the pattern existing in the instance image. Therefore, the reliability of the similarity is not influenced by the calculation accuracy of the feature amount, and an estrangement between the similarity and a human appearance does not occur. Further, a case does not occur in which similarities are the same as each other in case where the feature amounts of the retrieved image and the instance image are substantially coincident with each other in both large values, and in case where the feature amounts of the retrieved image and the instance image are substantially coincident with each other in both low values. Therefore, it is possible to provide a similar image retrieval device, a method of operating a similar image retrieval device, and a similar image retrieval program which are reliable and capable of retrieving a similar image having a sense of consent coincident with the similarity of a human appearance.

BRIEF DESCRIPTION OF THE DRAWINGS

FIG. 3 is a diagram illustrating contents of a request for the acquisition of a similar image.

FIG. 4 is a diagram illustrating an inspection image display window for displaying an inspection image and receiving the designation of a region of interest ROI.

FIG. 8 is a diagram illustrating a correspondence relation between feature amounts and patterns of lesions.

FIG. 9 is a diagram illustrating a method of creating a calculation expression for calculating a first existence probability Px.

FIG. 13 is a diagram illustrating contents of a list.

FIG. 15 is a flow diagram illustrating a processing procedure of the CPU of the similar image retrieval server.

FIG. 16 is a flow diagram illustrating a processing procedure of similarity calculation.

FIG. 17A is a diagram illustrating calculation results of a coexistence probability Pxy in case where Expression (2-A) is used.

FIG. 17B is a diagram illustrating calculation results of the coexistence probability Pxy in case where Expression (2-B) is used.

FIG. 18A is a diagram illustrating calculation results of a non-coexistence probability NPxy in case where Expression (3-A) is used.

FIG. 18B is a diagram illustrating calculation results of the non-coexistence probability NPxy in case where Expression (3-B) is used.

FIG. 19A is a diagram illustrating calculation results of the non-coexistence probability NPxy in case where Expression (3-A) is used.

FIG. 19B is a diagram illustrating calculation results of the non-coexistence probability NPxy in case where Expression (3-C) is used.

DESCRIPTION OF THE PREFERRED EMBODIMENTS

First Embodiment

Figure 1:
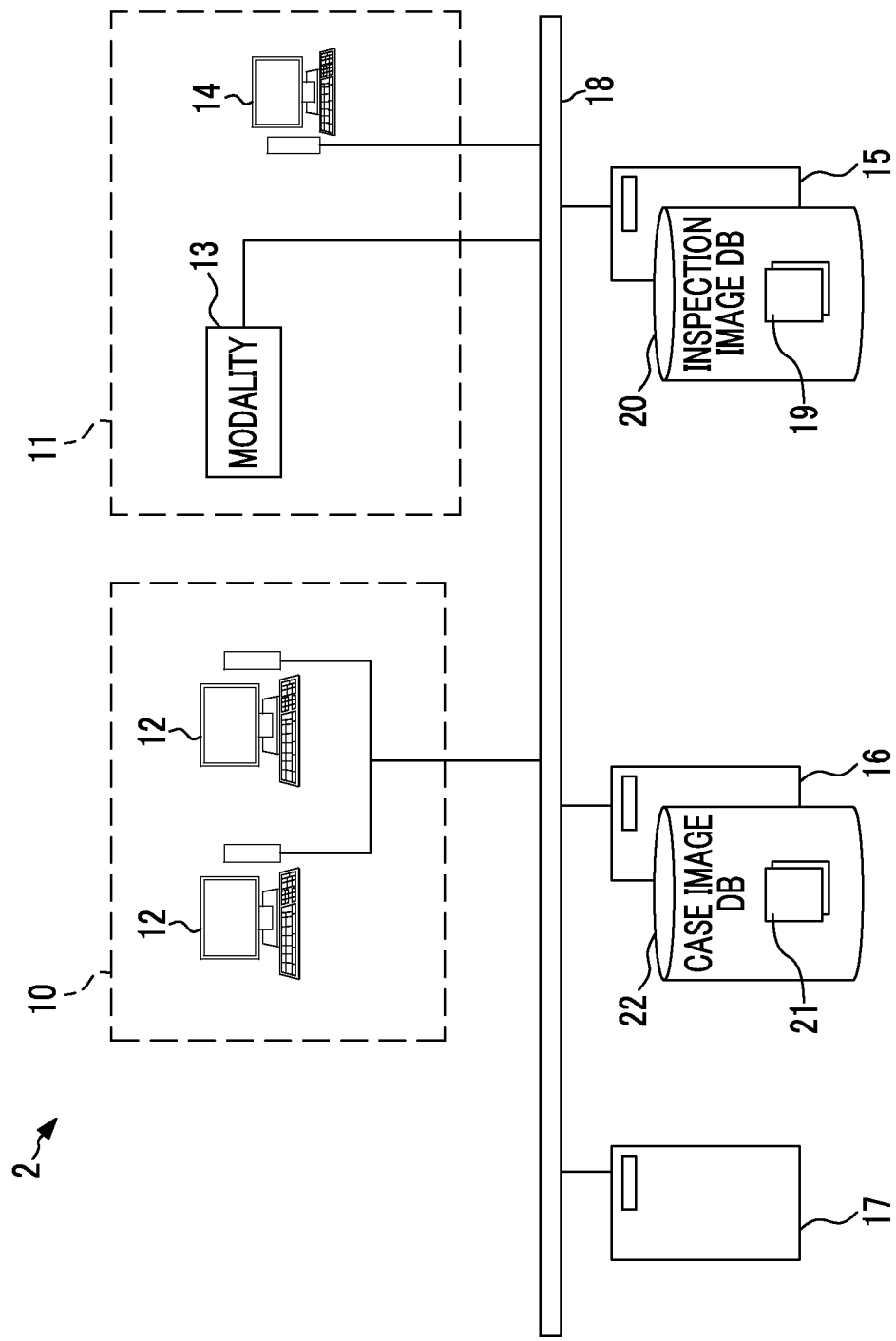
FIG. 1 is a configuration diagram illustrating a medical information system including a similar image retrieval server.

In FIG. 1, a medical information system 2 is constituted by diagnosis and treatment department terminals 12 which are constructed in medical facilities, such as a hospital, including a diagnosis and treatment department 10 or a medical inspection department 11, and is installed in the diagnosis and treatment department 10, a modality 13 and an order management terminal 14 which are installed in the medical inspection department 11, an inspection image database (hereinafter, abbreviated to DB) server 15, a case image DB server 16, and a similar image retrieval server 17. These terminals and servers are connected to each other through a network 18 such as a LAN (Local Area Network) which is constructed within medical facilities.

The diagnosis and treatment department terminal 12 is used in issuing inspection orders in order for a doctor to request various medical inspections from the medical inspection department 11, in addition to an input or inspection of an electronic medical chart by a doctor of the diagnosis and treatment department 10. In addition, the diagnosis and treatment department terminal 12 also functions as an image display terminal for inspecting an inspection image 19 captured in the modality 13 or a similar image retrieved in the similar image retrieval server 17.

The modality 13 is a device, capturing the inspection image 19, such as a CT device or an MRI device that captures a tomographic image as the inspection image 19, or a general X-ray photography device that captures a simple X-ray fluoroscopic image as the inspection image 19. The order management terminal 14 receives inspection orders issued in the diagnosis and treatment department terminal 12, and manages the received inspection orders. The inspection order has various types of items of, for example, an order ID (Identification data) for identifying individual inspection orders, an ID of the diagnosis and treatment department terminal 12 or a doctor ID of a doctor that issues a corresponding inspection order, a patient ID of a patient to be radiographed based on the corresponding inspection order, an inspection object of follow-up or the like, a radiographing region such as the head or the chest, and a direction such as lying on the back or lying face down. An engineer of the medical inspection department 11 confirms contents of an inspection order in the order management terminal 14, and sets radiographing conditions based on the confirmed inspection order in the modality 13 to thereby capture the inspection image 19.

When the inspection image 19 is captured by the modality 13, information on a patient ID of a patient to be radiographed and an engineer ID of an engineer who takes charge of radiographing is input by the engineer. The input information is associated with the inspection image 19 as supplementary information.

The inspection image 19 is created by, for example, a data file format based on a DICOM (Digital Imaging and Communications in Medicine) standard. The DICOM standard-based data file is provided with a region having supplementary information stored therein, in addition to a region having data of the inspection image 19 itself stored therein. The supplementary information includes patient information of a patient ID, a patient name, and a patient's sex, age, height and weight, inspection information on an order ID, a doctor ID, an inspection date, an inspection object, a radiographing region and an orientation, radiographing conditions, an engineer ID, a type of medical inspection (type of modality 13 such as CT or MRI), and an image ID for identifying the individual inspection images 19. The image ID is automatically attached by the modality 13 during the capturing of the inspection image 19. The modality 13 transmits the inspection image 19 to the inspection image DB server 15.

The inspection image DB server 15 is a so-called PACS (Picture Archiving and Communication System) server, and includes an inspection image DB 20 having a plurality of inspection images 19 from the modality 13 stored therein. The inspection image DB server 15 receives a request for the acquisition of the inspection images 19 from the diagnosis and treatment department terminal 12, and retrieves an inspection image 19 corresponding to the acquisition request from the inspection image DB 20. The retrieved inspection image 19 is transmitted to the diagnosis and treatment department terminal 12 that has transmitted the acquisition request. The acquisition request includes various types of items of the supplementary information of the inspection image 19, for example, an order ID or an image ID, and the inspection image DB server 15 outputs an inspection image 19, coincident with an order ID or an image ID of the acquisition request, as a retrieval result.

The case image DB server 16 is the same PACS server as the inspection image DB server 15, and includes a case image DB 22 having a plurality of case images 21 stored therein. The case image 21 is an inspection image 19 which has been used for a diagnosis in the past, and is equivalent to an instance image. Similarly to the inspection image DB server 15, the case image DB server 16 also receives a request for the acquisition of the case images 21 from the similar image retrieval server 17, retrieves a case image 21 corresponding to the acquisition request from the case image DB 22, and transmits the retrieved case image 21 to the similar image retrieval server 17.

Region information 25 (see FIG. 3) which is information of a region of interest ROI (see FIG. 4) designated in the past diagnosis, a report ID of a radiographic interpretation report obtained by radiographically interpreting and creating the case image 21, and a second existence probability Py (see FIG. 6), calculated in the past diagnosis, which is a probability of the pattern of a lesion, exhibiting the symptom of a disease, existing within the case image 21 are associated with the case image 21 as supplementary information, in addition to the same supplementary information as that of the inspection image 19. The radiographic interpretation report is stored in a report DB of a report DB server which is not shown. Similarly to each of the DB servers 15 and 16, the report DB server can retrieve and transmit a radiographic interpretation report corresponding to an acquisition request from the diagnosis and treatment department terminal 12 or the like. The region information 25 and the second existence probability Py are used in case where a similarity S between the inspection image 19 and the case image 21 is calculated in the similar image retrieval server 17, and the results are output. Hereinafter, as in the second existence probability Py, a suffix "y" is attached to those related to the case image 21.

The similar image retrieval server 17 is equivalent to a similar image retrieval device of the present invention. The similar image retrieval server 17 receives a request for the acquisition of a similar image from the diagnosis and treatment department terminal 12. The inspection image 19 is included in the acquisition request. The similar image retrieval server 17 retrieves a similar image which is similar to the received inspection image 19, from the plurality of case images 21 stored in the case image DB 22. That is, the inspection image 19 is equivalent to the retrieved image. The similar image retrieval server 17 transmits the retrieval results of the similar image to the diagnosis and treatment department terminal 12.

Figure 2:
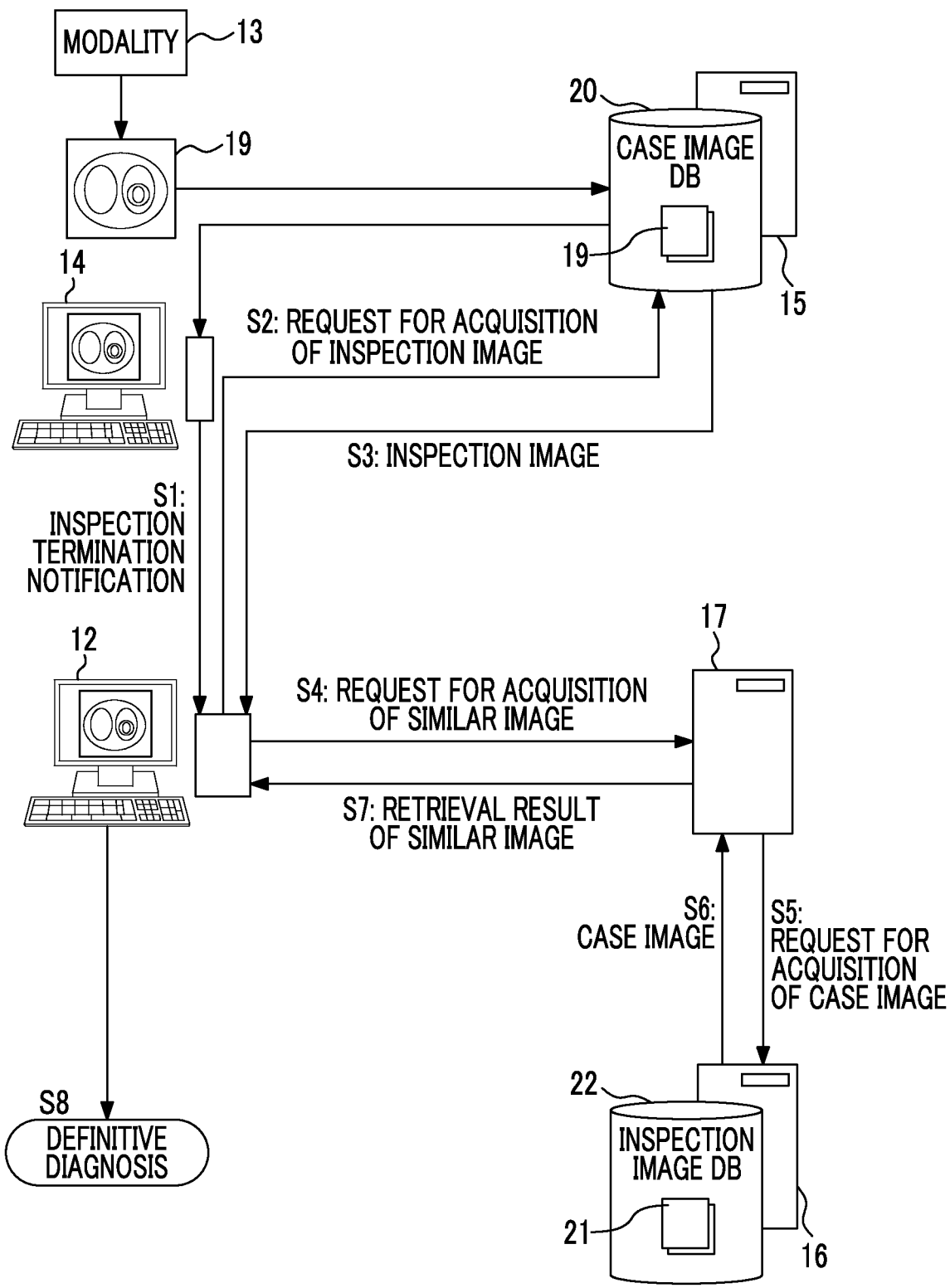
FIG. 2 is a diagram illustrating a flow from a medical inspection to a definitive diagnosis.

In FIG. 2, when radiographing performed by the modality 13 is terminated and the inspection image 19 is stored in the inspection image DB 20, the order management terminal 14 issues an inspection termination notification to the diagnosis and treatment department terminal 12 which has issued an inspection order, as shown in step S1. An image ID or an order ID of the inspection image 19 is attached to the inspection termination notification.

A doctor confirms the inspection termination notification through the diagnosis and treatment department terminal 12, and transmits a request for the acquisition of the inspection image 19 including the image ID or the order ID affixed to the inspection termination notification, to the inspection image DB server 15 through the diagnosis and treatment department terminal 12 (step S2). The inspection image 19 is transmitted from the inspection image DB server 15 to the diagnosis and treatment department terminal 12 in accordance with this acquisition request (step S3).

A doctor inspects the inspection image 19 from the inspection image DB server 15 through the diagnosis and treatment department terminal 12. When a patient suffers from some kind of disease, a lesion exhibiting the symptom of the disease is reflected in the inspection image 19. In order to acquire a similar image to the inspection image 19 in which the lesion is reflected, a doctor transmits a request for the acquisition of a similar image including the inspection image 19 in which the lesion is reflected, to the similar image retrieval server 17 through the diagnosis and treatment department terminal 12 (step S4).

When the request for the acquisition of a similar image is received, the similar image retrieval server 17 transmits a request for the acquisition of the case image 21 to the case image DB server 16 (step S5). The case image 21 is transmitted from the case image DB server 16 to the similar image retrieval server 17, in accordance with this acquisition request (step S6). The similar image retrieval server 17 retrieves a similar image which is similar to the inspection image 19 from the case images 21, and transmits the retrieval results to the diagnosis and treatment department terminal 12 (step S7).

A doctor inspects the retrieval results of the similar image from the similar image retrieval server 17, through the diagnosis and treatment department terminal 12. In addition, a radiographic interpretation report associated with the similar image is received, as necessary, from the report DB server, and the radiographic interpretation report is inspected through the diagnosis and treatment department terminal 12. A doctor makes a definitive diagnosis for specifying a disease of a patient on the basis of the retrieval results of the similar image, the radiographic interpretation report, his/her own experience, and the like (step S8).

In FIG. 3, the information of a region of interest ROI (hereinafter, referred to as region information) 25 of the inspection image 19 which is designated by a doctor is attached to the request for the acquisition of the similar image which is transmitted from the diagnosis and treatment department terminal 12 to the similar image retrieval server 17, in addition to the inspection image 19 as the retrieved image. The region information 25 is, for example, coordinate information in which the positions of pixels constituting the inspection image 19 are represented by two-dimensional coordinates, and is used in case where a feature amount Zx (see FIG. 6) corresponding to the pattern of a lesion is calculated in the similar image retrieval server 17. In the following, as in the feature amount Zx, a suffix "x" is attached to those related to the inspection image 19, and thus a distinction is made from those related to the case image 21 to which the suffix "y" is attached. In addition, a suffix "xy" is attached to those related to both the inspection image 19 and the case image 21.

The designation of a region of interest ROI which is performed by a doctor is performed by, for example, an inspection image display window 30 shown in FIG. 4. The inspection image display window 30 is a window in order for a doctor to inspect the inspection image 19 from the inspection image DB server 15, and is displayed on a display unit of the diagnosis and treatment department terminal 12.

The inspection image display window 30 is provided with an input box 31 for inputting an image ID or an order ID which is affixed to an inspection termination notification, an image display region 32 for displaying the inspection image 19 from the inspection image DB server 15, a button group 33, and the like.

A retrieval button 34 is provided on the lateral side of the input box 31. In case where a desired image ID or order ID is input to the input box 31 and the retrieval button 34 is selected by a cursor 35, a request for the acquisition of the inspection image 19 is transmitted to the inspection image DB server 15. An inspection image 19 and an image ID corresponding to the acquisition request are displayed on the image display region 32. In the image display region 32, a display of the inspection image 19 can be switched by, for example, scrolling or frame advancing.

The button group 33 includes a region designation button 36, a designation clear button 37, and a similar image retrieval button 38. The region designation button 36 is an operation button for designating a region of interest ROI, and the designation clear button 37 is an operation button for canceling the designated region of interest ROI. In case where the region designation button 36 is selected by the cursor 35, a region designation operation for designating an arbitrary region of the inspection image 19 can be performed. The region designation operation is performed by, for example, designating a plurality of control points using the cursor 35 so as to surround the outer circumference of a region including a lesion within the inspection image 19. The inside of a spline (shown by a dashed-dotted line) representing a smooth curve passing through the plurality of control points is designated as a region of interest ROI.

In case where the region of interest ROI is designated by the spline and then the similar image retrieval button 38 is selected by the cursor 35, the retrieved image 19 displayed on the image display region 32 in this case and information of the region of interest ROI designated by the spline, that is, the region information 25 are transmitted to the similar image retrieval server 17, as a request for the acquisition of a similar image.

Figure 5:
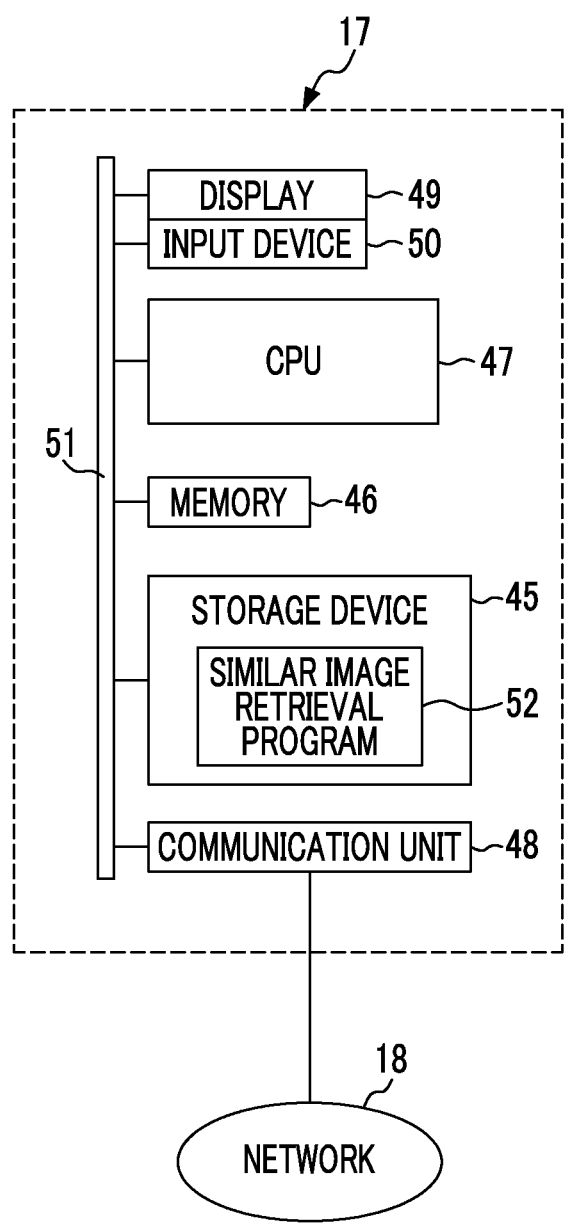
FIG. 5 is a block diagram illustrating a computer constituting a similar image retrieval server.

In FIG. 5, a computer constituting the similar image retrieval server 17 includes a storage device 45, a memory 46, a CPU (Central Processing Unit) 47, a communication unit 48, a display unit 49, and an input device 50. These components are connected to each other through a data bus 51.

The storage device 45 is a hard disk drive which is built into the computer constituting the similar image retrieval server 17 or connected through a cable or a network, or a disk array having a plurality of hard disk drives mounted in sequence. A control program such as an operating system, various types of application programs including a similar image retrieval program 52, displaying data of various types of operation screens associated with these programs, and the like are stored in the storage device 45. The similar image retrieval program 52 is a program for causing the computer constituting the similar image retrieval server 17 to function as a similar image retrieval device.

The memory 46 is a work memory for the CPU 47 to execute a process. The CPU 47 loads programs stored in the storage device 45 into the memory 46 and executes processes according to the programs, to thereby control each unit of the computer as a whole.

The communication unit 48 is a network interface for performing control of the transmission of various information to the diagnosis and treatment department terminal 12 or the like through the network 18. The communication unit 48 receives the case image 21 from the case image DB server 16, receives the request for the acquisition of a similar image from the diagnosis and treatment department terminal 12, transmits the request for the acquisition of the case image 21 to the case image DB server 16, and transmits the retrieval results of a similar image to the diagnosis and treatment department terminal 12.

The display unit 49 displays various types of operation screens according to operations of the input device 50 such as a mouse or a keyboard. A GUI (Graphical User Interface) is arranged on the operation screen. The similar image retrieval server 17 receives an input of an operation instruction from the input device 50 through this GUI.

Figure 6:
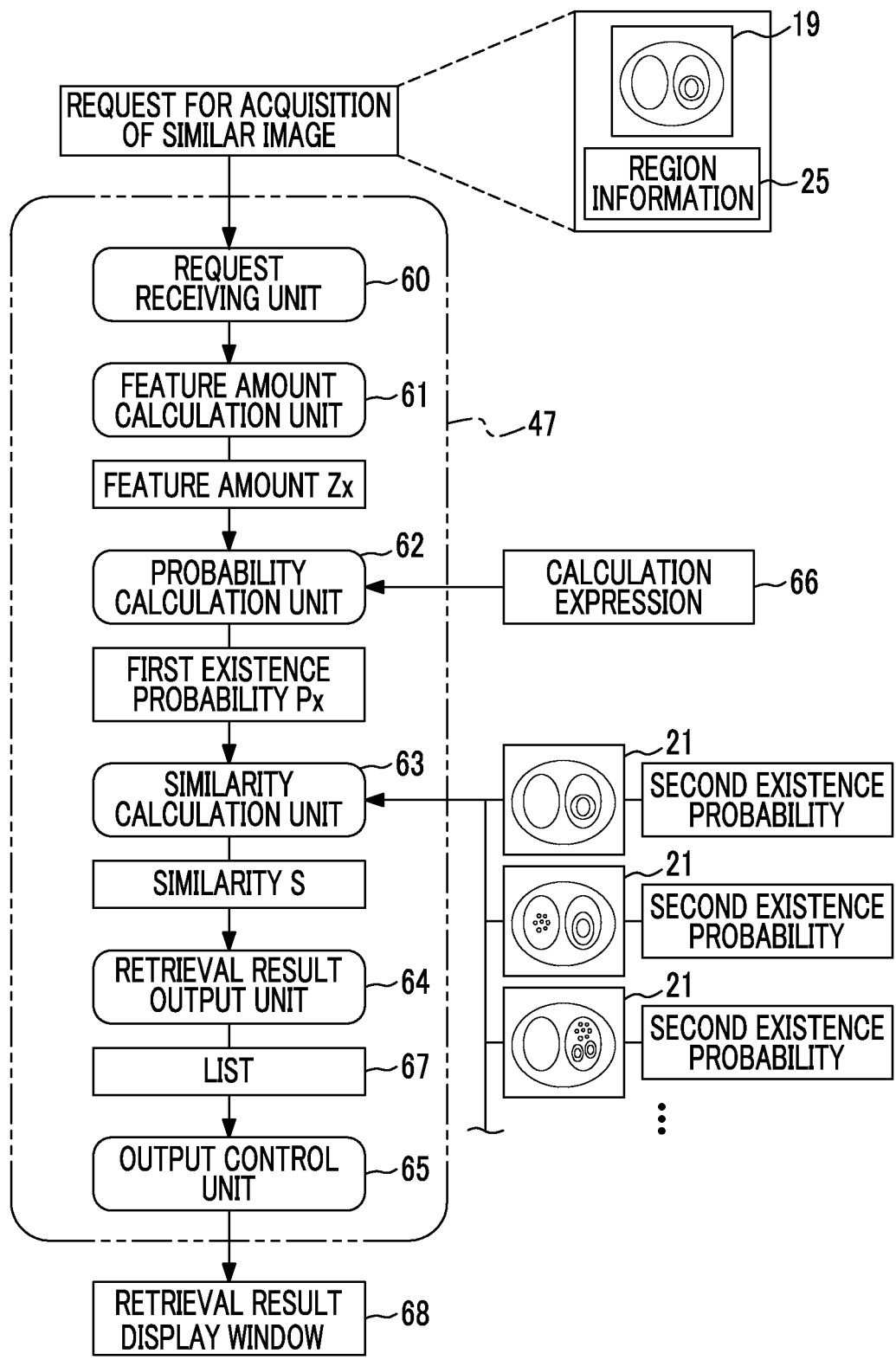
FIG. 6 is a block diagram illustrating a function of a CPU of the similar image retrieval server.

In FIG. 6, in case where the similar image retrieval program 52 is started up, the CPU 47 functions as a request receiving unit 60, a feature amount calculation unit 61, a probability calculation unit 62, a similarity calculation unit 63, a retrieval result output unit 64, and an output control unit 65, in cooperation with the memory 46.

The request receiving unit 60 takes charge of a request receiving function of receiving a request for the acquisition of a similar image which is transmitted from the diagnosis and treatment department terminal 12 and is received in the communication unit 48. The request receiving unit 60 stores the inspection image 19 and the region information 25 of the received request for the acquisition of a similar image, in the storage device 45.

The feature amount calculation unit 61 takes charge of a feature amount calculation function of analyzing the inspection image 19 and calculating the feature amount Zx. The feature amount calculation unit 61 reads out the inspection image 19 and the region information 25 from the storage device 45, and specifies a region of interest ROI designated in the inspection image 19 on the basis of the region information 25. The feature amount Zx of the specified region of interest ROI is calculated. The feature amount calculation unit 61 outputs the calculated feature amount Zx to the probability calculation unit 62.

The probability calculation unit 62 takes charge of a probability calculation function of calculating a first existence probability Px on the basis of the feature amount Zx from the feature amount calculation unit 61. The first existence probability Px is a probability of the pattern of a lesion existing within the region of interest ROI of the inspection image 19. The probability calculation unit 62 calculates the first existence probability Px using a calculation expression 66. The probability calculation unit 62 outputs the calculated first existence probability Px to the similarity calculation unit 63.

Here, in the meaning that the feature amount Zx which is calculated in the feature amount calculation unit 61 also indicates the degree of the pattern of a lesion existing in the region of interest ROI of the inspection image 19 as described later, the feature amount resembles the first existence probability Px which is a probability of the pattern of a lesion existing within the region of interest ROI of the inspection image 19. However, the feature amount Zx is an amount which is calculated by an image analysis of the inspection image 19 based on pattern matching, and is not an amount in which the determination of the presence or absence of the pattern of a lesion that a person such as a doctor actually views through his/her eyes is reflected. On the other hand, the first existence probability Px is calculated by a statistical method based on a human visual impression. In this point, the feature amount Zx and the first existence probability Px are essentially different from each other.

Specifically, the calculation expression 66 for calculating the first existence probability Px is created in advance by a statistical method on the basis of a relationship between the presence or absence of the pattern of a lesion within an image for learning which is visually determined by a person and the feature amount Z of the image for learning, and is configured such that the feature amount Zx is used as a variable. For this reason, the first existence probability Px indicates the determination of how frequently the pattern of a lesion exists or does not exist with respect to a value of the feature amount Zx which is a result of the image analysis of the inspection image 19 in case where a person actually views the inspection image 19 having the value, and is a probability in which the determination of the presence or absence of the pattern of a lesion that a person actually views is reflected unlike the feature amount Zx.

The similarity calculation unit 63 takes charge of a similarity calculation function of calculating the similarity S between the inspection image 19 and each of all the case images 21 stored in the case image DB 22. The similarity calculation unit 63 calculates the similarity S on the basis of the first existence probability Px from the probability calculation unit 62 and the second existence probability Py affixed to the case image 21. The similarity calculation unit 63 outputs the calculated similarity S to the retrieval result output unit 64.

The retrieval result output unit 64 takes charge of a retrieval result output function of outputting a set of the similar image and the similarity S as retrieval results. More specifically, the retrieval result output unit 64 outputs a list 67 (also see FIG. 13), obtained by sorting a set of the similar image and the similarity S in order of the similarity S, as the retrieval results of the similar image.

The output control unit 65 receives the list 67 from the retrieval result output unit 64. The output control unit 65 creates a retrieval result display window 68 (also see FIG. 14) on the basis of the received list 67. The retrieval result display window 68 is, for example, XML data for WEB distribution which is created by a markup language such as XML (Extensible Markup Language). The output control unit 65 outputs the created retrieval result display window 68 to the communication unit 48, together with information (for example, information of an IP (Internet Protocol) address of the diagnosis and treatment department terminal 12) of the diagnosis and treatment department terminal 12 that makes a request for the acquisition of a similar image. The communication unit 48 transmits the retrieval result display window 68 to the diagnosis and treatment department terminal 12 that makes a request for the acquisition of a similar image.

Figure 7:
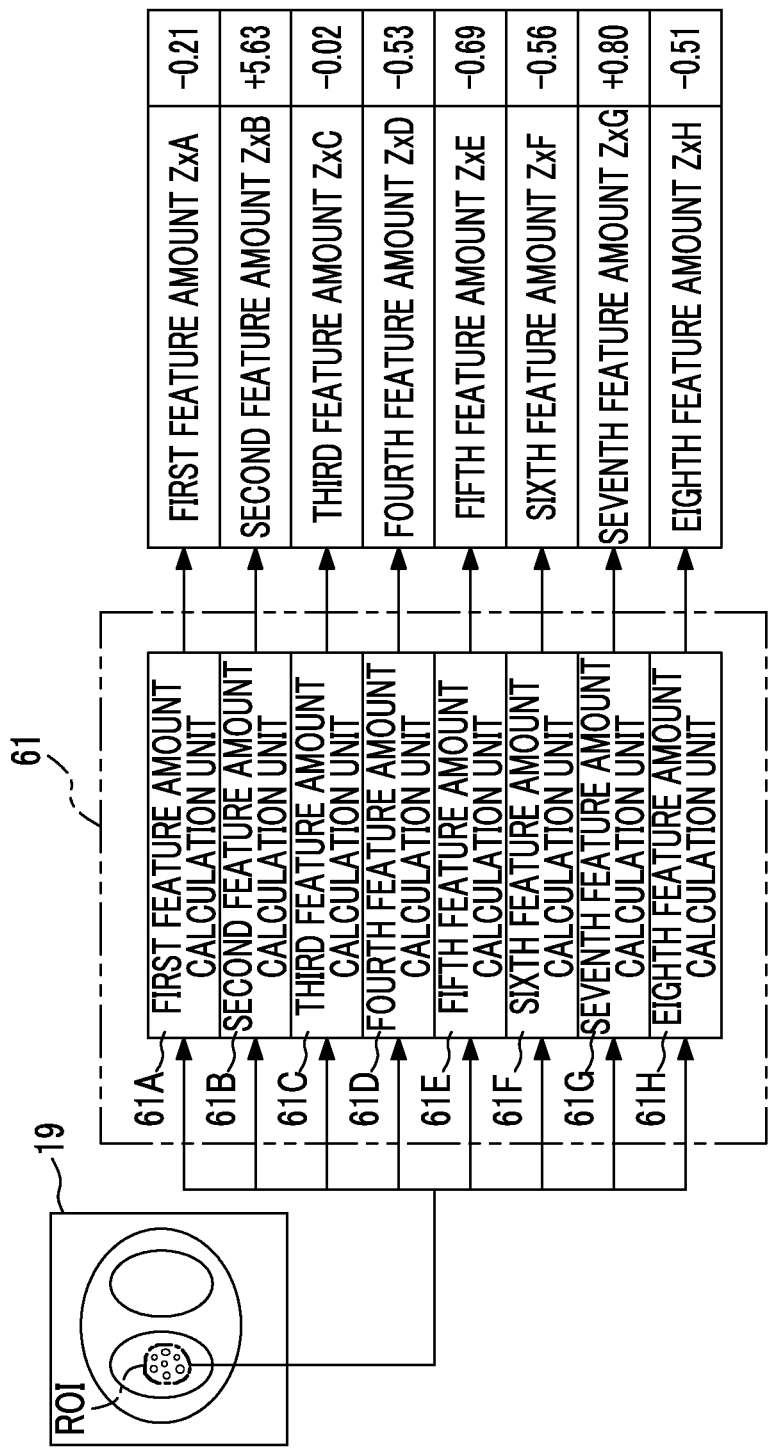
FIG. 7 is a block diagram illustrating a detailed configuration and a function of a feature amount calculation unit.

In FIG. 7, regarding the region of interest ROI of the inspection image 19, the feature amount calculation unit 61 includes a first feature amount calculator 61A, a second feature amount calculator 61B, a third feature amount calculator 61C, a fourth feature amount calculator 61D, a fifth feature amount calculator 61E, a sixth feature amount calculator 61F, a seventh feature amount calculator 61G, and an eighth feature amount calculator 61H that calculate a total of eight types of first feature amount ZxA, second feature amount ZxB, third feature amount ZxC, fourth feature amount ZxD, fifth feature amount ZxE, sixth feature amount ZxF, seventh feature amount ZxG, and eighth feature amount ZxH, respectively. As illustrated by numerical values such as "−0.21" or "+5.63", each of the feature amounts ZxA to ZxH can take a positive or negative value. 8-dimension vectors including these eight types of respective feature amounts ZxA to ZxH as elements are called feature vectors. Hereinafter, as in each of the feature amount calculators 61A to 61H, a suffix "A" is attached to a thing related to the first feature amount ZxA, a suffix "B" is attached to a thing relates to the second feature amount ZxB, and suffixes "A" to "H" of the corresponding alphabet are attached to things relates to the respective feature amounts ZxA to ZxH in this manner, and thus the feature amounts are distinguished from each other.

In FIG. 8, the respective feature amounts ZxA to ZxH correspond to multiple types of typical patterns of lesions which are registered in advance. Specifically, the first feature amount ZxA corresponds to an abnormal shadow of a low respiratory area (such as emphysema, pneumothorax, or bulla), the second feature amount ZxB corresponds to vomica, the third feature amount ZxC corresponds to an abnormal shadow of the bronchus (such as thickened bronchial walls, bronchial dilatation, traction bronchiectasis, or air bronchogram), the fourth feature amount ZxD corresponds to a honeycomb lung, the fifth feature amount ZxE corresponds to a frosted glass shadow, the sixth feature amount ZxF corresponds to a punctate shadow (such as nodular shadow or TIB (Tree-in-Bud)), the seventh feature amount ZxG corresponds to an abnormal shadow of a high absorption area (such as consolidation, nodule, or bronchial mucous gland), and the eighth feature amount ZxH corresponds to patterns of various lesions of a punctate shadow and a reticular shadow.

Each of the feature amounts ZxA to ZxH indicates pattern identities of corresponding various lesions, and is a value indicating the degree of the pattern of a lesion existing in the region of interest ROI. For this reason, it is indicated that the degree of the pattern of a corresponding lesion existing in the region of interest ROI becomes higher as each of the feature amounts ZxA to ZxH becomes larger, and it is indicated that the degree of the pattern of a corresponding lesion existing in the region of interest ROI becomes lower as each of the feature amounts ZxA to ZxH becomes smaller. Furthermore, in case where each of the feature amounts ZxA to ZxH is a positive value, it is indicated that the pattern of a corresponding lesion exists in the region of interest ROI with a high probability. In case where the feature amount is a negative value, it is indicated that the pattern of a corresponding lesion does not exist in the region of interest ROI with a high probability. It is indicated that as the value which is positive becomes larger, the degree of the pattern of a corresponding lesion existing in the region of interest ROI becomes higher.

However, as described above, since the feature amount Zx is not an amount in which the determination of the presence or absence of the pattern of a lesion that a person actually views through eyes is reflected, the pattern of a lesion does not necessarily exist actually in the region of interest ROI in case where the feature amount Zx is a positive value, and the pattern of a lesion may possibly exists actually in the region of interest ROI in case where the similarly feature amount Zx is a negative value.

In the example of FIG. 7, the second feature amount ZxB corresponding to the pattern of vomica and the seventh feature amount ZxG corresponding to the pattern of an abnormal shadow of a high absorption area indicate a positive value, and each of other feature amounts ZxA, ZxC to ZxF, and ZxH indicates a negative value. Since the second feature amount ZxB is "+5.63" and is a value larger than "+0.80" of the seventh feature amount ZxG, it can be understood that vomica and an abnormal shadow of a high absorption area exist in the region of interest ROI, and vomica is dominant above all.

Each of the feature amount calculators 61A to 61H can be created by a machine learning algorithm such as "AdaBoost (Adaptive Boosting)", for example, using a well-known feature amount as disclosed in "Document Name: Computer Vision and Image Understanding, 88 vol., 119 pp. to 151 pp, Using Human Perceptual Categories for Content-Based Retrieval from a Medical Image Database, issued in December, 2002, authored by Chi-Ren Shyu, Christina Pavlopoulou Avinash C.kak, and Cala E. Brodley" or the like.

Meanwhile, in the present embodiment, eight types of feature amount ZxA to ZxH corresponding to the pattern of eight types of lesion are illustrated, but the feature amount Zx may be smaller or larger than eight types. In addition, the feature amount Zx may be one type. In addition, the feature amount Zx corresponding to the pattern of one lesion is set to one type, but the feature amount Zx corresponding to the pattern of one lesion may be set to multiple types.

In FIG. 9, the calculation expression 66 in which the probability calculation unit 62 is used in the calculation of the first existence probability Px is created on the basis of visual determination data 75. The visual determination data 75 is stored in the storage device 45. In the visual determination data 75, the presence or absence of the pattern which is a result in which a person such as a doctor visually determines whether the pattern of a lesion exists within a plurality of images for learning 1, 2, and the feature amount Z calculated by the feature amount calculation unit 61 with respect to the region of interest ROI of the image for learning are stored for each pattern of a lesion. The visual determination data 75 is created by, for example, causing a doctor to inspect the case image 21 periodically as an image for learning through the diagnosis and treatment department terminal 12, and causing a doctor to input the presence or absence of the pattern determined by the doctor. A doctor who determines the presence or absence of the pattern may be, for example, doctors of other medical facilities such as a radiogram interpretation doctor of a radiographic interpretation center who receives a request for remote radiographic interpretation of the inspection image 19. Meanwhile, in FIG. 9, a frosted glass shadow and a punctate shadow are illustrated as the pattern of a lesion, and the patterns of other lesions are omitted due to the limitations of space.

In case where a doctor is caused to determine the presence or absence of the patterns of a plurality of images for learning having the feature amounts Z of the same value, the feature amount Z is not an amount in which the determination of the presence or absence of the pattern of a lesion that a person actually views through eyes is reflected as described above. For this reason, even in case where the feature amounts Z have the same value, there may be a case where the pattern of a lesion is determined to be present and a case where the pattern is determined not to be present. With respect to the plurality of images for learning, the proportion of the images for learning in which a doctor determines the pattern of a lesion to be present is set to a first existence probability P related to the feature amount Z. For example, a relation of the first existence probability P=1 (100%) is established in case where the number of images for learning having the feature amounts Z of the same value is 100 and the pattern of a lesion is determined to be present in all the 100 images, a relation of the first existence probability P=0.5 (50%) is established in case where the pattern of a lesion is determined to be present in 50 of the 100 images, and a relation of the first existence probability P=0 (0%) is established in case where the pattern of a lesion is determined not to be present in all the 100 images.

Figure 10:
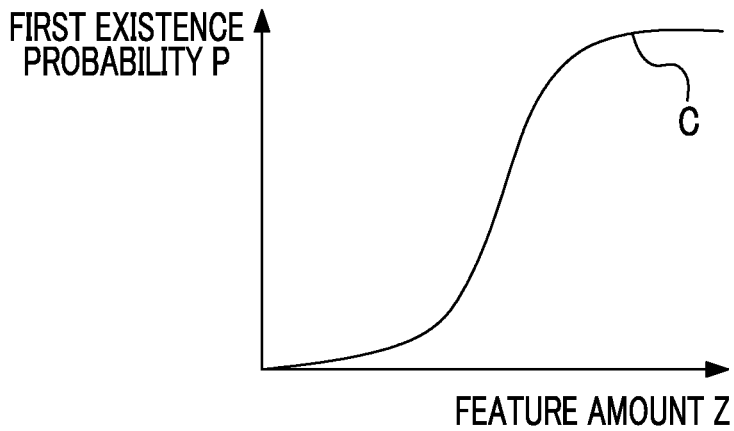
FIG. 10 is a graph illustrating a relationship between a feature amount Z and a first existence probability P.

In case where the first existence probability P for each feature amount Z is obtained on the basis of such determination results of a doctor, and the results are plotted in a graph in which the feature amount Z is set to a horizontal axis and the first existence probability P is set to a vertical axis, a relationship between the feature amount Z and the first existence probability P forms a substantially S-shaped curve C, for example, as shown in FIG. 10. This curve C is called a logistic curve, and the relationship between the feature amount Z and the first existence probability P can be represented by an expression (P=1/{1+exp(−A0−A1×Z)}), called a logistic function, in which the feature amount Z is used as a variable. That is, the first existence probability P and the feature amount Z correspond to an objective variable and an explanatory variable, respectively, as set forth in statistics. Here, A0 and A1 are coefficients, and these coefficients are calculated by a logistic regression analysis, thereby allowing the calculation expression 66 to be obtained.

Specifically, the calculation expression 66 is represented by the following Expression (1-A).

$$Px=1/\{1+\exp(-A0-A1\times Zx)\} \quad (1\text{-}A)$$

Here, A0 and A1 are calculated by a logistic regression analysis as described above. The calculation expression 66 is created for each pattern of a lesion. FIG. 9 illustrates a calculation expression 66E (PxE=1/{1+exp(−AE0−AE1×ZxE)}) for calculating a first existence probability PxE of the pattern of a frosted glass shadow existing in the region of interest ROI of the inspection image 19, and a calculation expression 66F (PxF=1/{1+exp(−AF0−AF1×ZxF)}) for calculating a first existence probability PxF of the pattern of a punctate shadow existing in the region of interest ROI of the inspection image 19, and the calculation expression 66 for the patterns of other lesions is not shown.

For example, in case where the fifth feature amount ZxE is +1.31 in the relations of AE0=0.038 and AE1=2.08, the first existence probability PxE of the pattern of a frosted glass shadow existing in the region of interest ROI of the inspection image 19 is set to PxE=1/{1+exp (−0.038−2.08×1.31)}≈0.94. In addition, in case where the sixth feature amount ZxF is −1.16 in the relations of AF0=0.102 and AF1=3.21, the first existence probability PxF of the pattern of a punctate shadow existing in the region of interest ROI of the inspection image 19 is set to PxF=1/{1+exp(−0.102+3.21×1.16)}0.03. The probability calculation unit 62 calculates the first existence probabilities PxA to PxH of the patterns of various lesions, using the calculation expression 66 in this manner, Meanwhile, in case where the relationship between the feature amount Z and the first existence probability P is substantially linear, the calculation expression 66 may be created using a linear regression analysis rather than a non-linear regression analysis such as a logistic regression analysis.

In addition, in case where there are a plurality of feature amounts Zx corresponding to the pattern of one lesion, the calculation expression 66 is represented by the following Expression (1-B) in case where the plurality of feature amounts Zx are set to Zx1, Zx2, Zx3, . . . .

$$Px=1/\{1+\exp(-A0-A1\times Zx1-A2\times Zx2-A3\times Zx3-\ldots)\} \quad (1\text{-}B)$$

Here, A0, A1, A2, A3, . . . are coefficients, and are obtained by a logistic regression analysis similarly to Expression (1-A).

Regarding the second existence probability Py, in the past diagnosis, the feature amounts ZyA to ZyH of the region of interest ROI of the case image 21 are calculated in the feature amount calculation unit 61, and the second existence probabilities PyA to PyH of the patterns of various lesions are calculated in the probability calculation unit 62 on the basis of the feature amounts ZyA to ZyH, through a statistical method using the calculation expression 66 created on the basis of the visual determination data 75.

Figure 11:
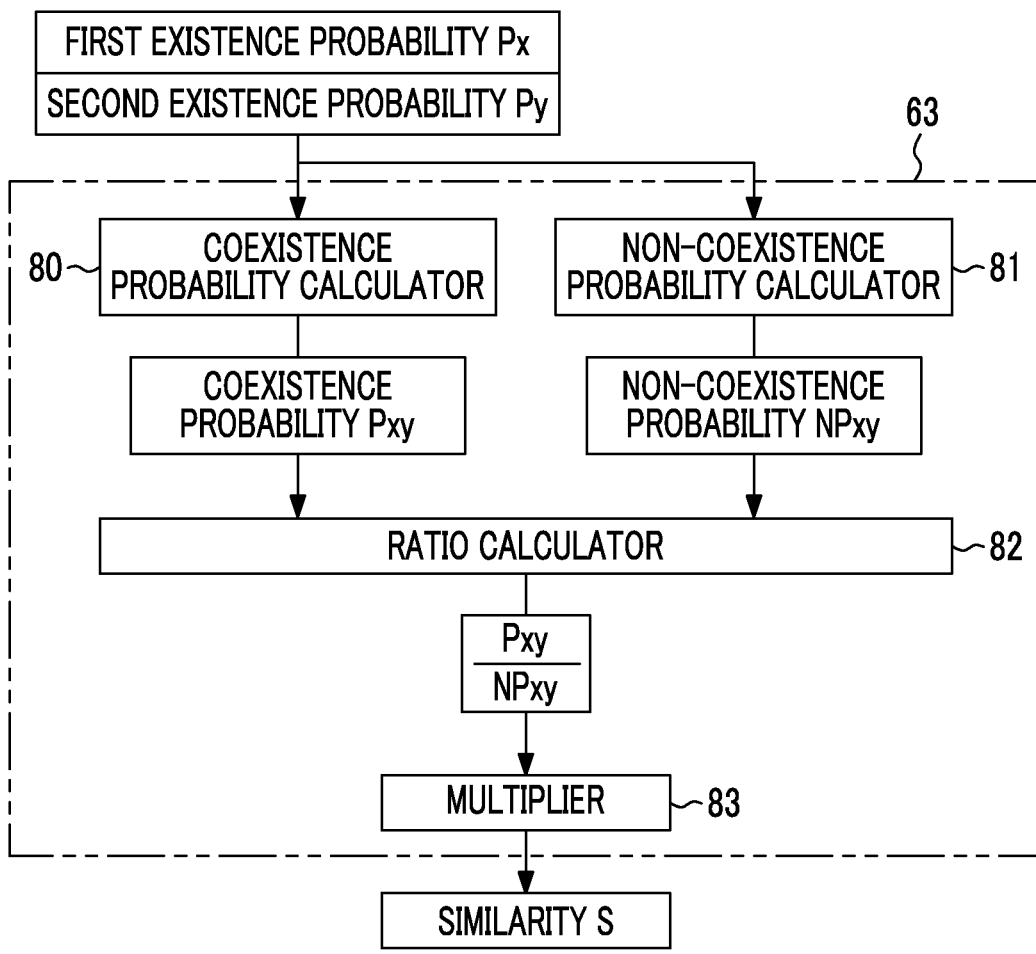
FIG. 11 is a block diagram illustrating a configuration and a function of a similarity calculation unit.
Figure 12:
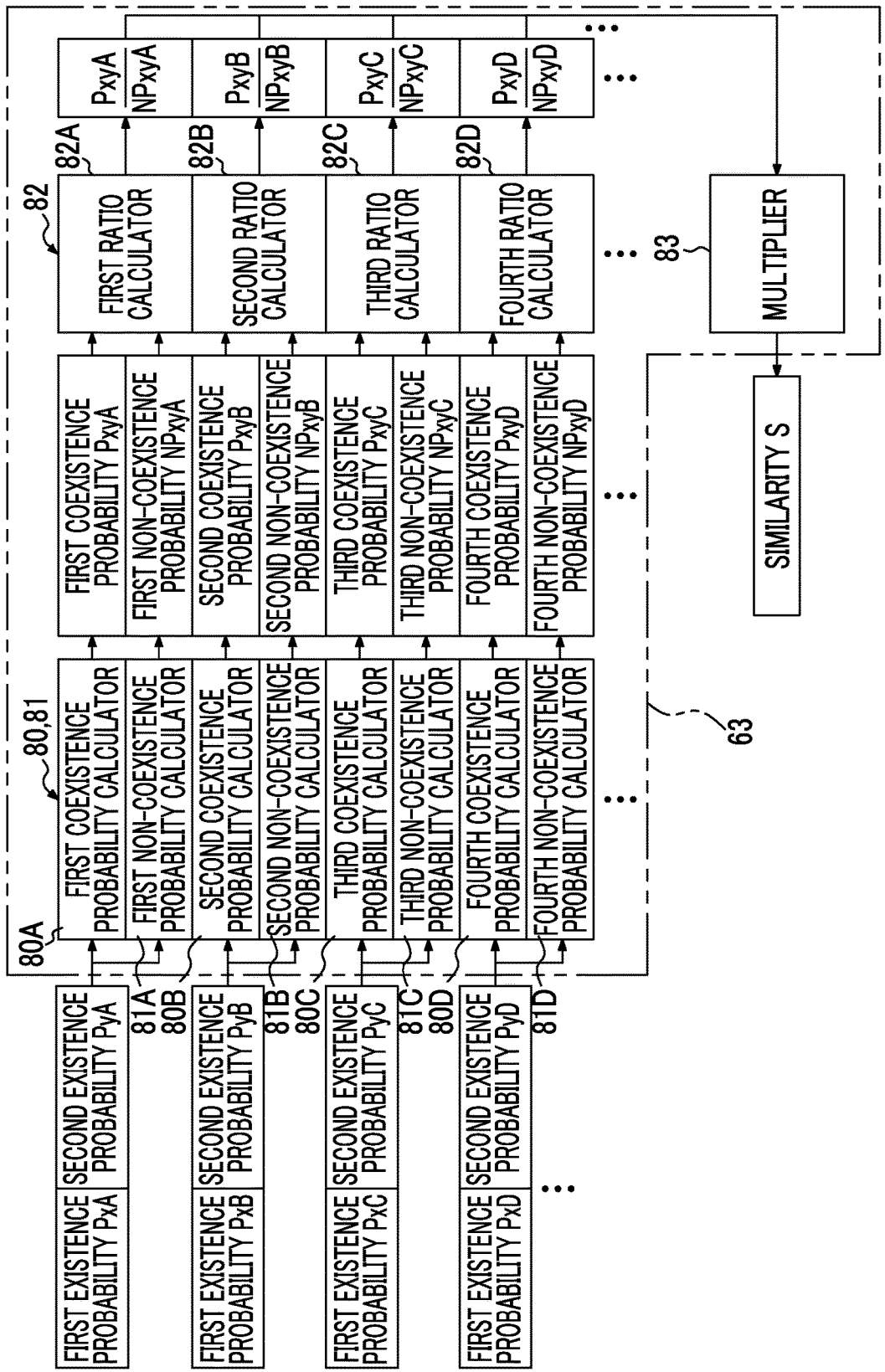
FIG. 12 is a block diagram illustrating a detailed configuration and a function of the similarity calculation unit.

In FIGS. 11 and 12, the similarity calculation unit 63 includes a coexistence probability calculator 80, a non-coexistence probability calculator 81, a ratio calculator 82, and a multiplier 83. The coexistence probability calculator 80 calculates a coexistence probability Pxy which is a probability of the pattern of a lesion existing in both the regions of interest ROI of the inspection image 19 and the case image 21, on the basis of each of the existence probabilities Px and Py. Specifically, the coexistence probability Pxy is calculated by the following expression (2-A).

$$Pxy=Px\times Py \quad (2\text{-}A)$$

The non-coexistence probability calculator 81 calculates a non-coexistence probability NPxy which is a probability of the pattern of a lesion existing independently in only one of the regions of interest ROI of the inspection image 19 and the case image 21, on the basis of each of the existence probabilities Px and Py. Specifically, the non-coexistence probability NPxy is calculated by the following expression (3-A).

$$NPxy=Px\times(1-Py)+(1-Px)\times Py \quad (3\text{-}A)$$

Each of the calculation units 80 and 81 outputs each of the calculated probabilities Pxy and NPxy to the ratio calculator 82.

The ratio calculator 82 calculates a ratio Pxy/NPxy of the coexistence probability Pxy to the non-coexistence probability NPxy, and outputs the calculated ratio Pxy/NPxy to the multiplier 83.

As shown in FIG. 12 in detail, in order to calculate each of a first coexistence probability PxyA to an eighth coexistence probability PxyH of the patterns of eight types of lesion, the coexistence probability calculator 80 is provided with a total of eight first coexistence probability calculator 80A to eighth coexistence probability calculator 80H (fifth coexistence probability calculator 80E to eighth coexistence probability calculator 80H are not shown). Similarly, in order to calculate a first non-coexistence probability NPxyA to an eighth coexistence probability NPxyH, the non-coexistence probability calculator 81 is also provided with a first non-coexistence probability calculator 81A to an eighth non-coexistence probability calculator 81H (fifth non-coexistence probability calculator 81E to eighth non-coexistence probability calculator 81H are not shown). In addition, similarly, the ratio calculator 82 is also provided with a first ratio calculator 82A to an eighth ratio calculator 82H (fifth ratio calculator 82E to eighth ratio calculator 82H are not shown).

The multiplier 83 totally multiplies the first coexistence probability PxyA to the eighth coexistence probability PxyH from the first ratio calculator 82A to the eighth ratio calculator 82H by ratios PxyA/NPxyA to PxyH/NPxyH of each of the first non-coexistence probability NPxyA to the eighth non-coexistence probability NPxyH. Similarity, the calculation unit 63 outputs the calculation results of the total multiplication of ratios PxyA/NPxyA to PxyH/NPxyH based on the multiplier 83, as a similarity S. That is, the similarity S is represented by the following expression (4-A).

$$S=\Pi Pxy/NPxy=(PxyA/NPxyA)\times(PxyB/NPxyB)\times \\ (PxyC/NPxyC)\times(PxyD/NPxyD)\times(PxyE/NPxyE)\times \\ (PxyF/NPxyF)\times(PxyG/NPxyG)\times(PxyH/NPxyH) \quad (4\text{-}A)$$

The coexistence probability Pxy is an index indicating a similarity between the inspection image 19 and the case image 21 for each of the patterns of various lesions, and it can be said that the similarity between the inspection image 19 and the case image 21 becomes higher as the coexistence probability Pxy increases. Reversely, the non-coexistence probability NPxy is an index indicating a non-similarity between the inspection image 19 and the case image 21 for each of the patterns of various lesions, and it can be said that the similarity between the inspection image 19 and the case image 21 becomes lower as the non-coexistence probability NPxy increases. In addition, it can be said that the value of the ratio Pxy/NPxy becomes higher as the coexistence probability Pxy of a numerator becomes larger than the non-coexistence probability NPxy of a denominator, and the similarity between the inspection image 19 and the case image 21 becomes higher as the value becomes higher. The similarity S which is the total multiplication of the ratios PxyA/NPxyA to PxyH/NPxyH is a value in which the coexistence probability Pxy and the non-coexistence probability NPxy of the patterns of various lesions between the inspection image 19 and the case image 21 are comprehensively taken into consideration, and thus an index indicating a comprehensive similarity between the inspection image 19 and the case image 21. It can be said that the similarity between the inspection image 19 and the case image 21 becomes higher comprehensively as the similarity S becomes higher.

In FIG. 13, the list 67 includes items of an image ID of the case image 21 and a similarity S, with an item of an order at the head of the list. An ROI image obtained by cutting out the region of interest ROI of the case image 21 is attached to each case of the list 67, as a similar image. Since the list 67 is obtained by sorting a set of the similar image and the similarity S in order of the similarity S, the similarity S of the case image 21 of the image ID "F0044" ranked in the first order is naturally highest among all the case images 21, and the similarity S also becomes smaller as the order becomes lower.

Figure 14:
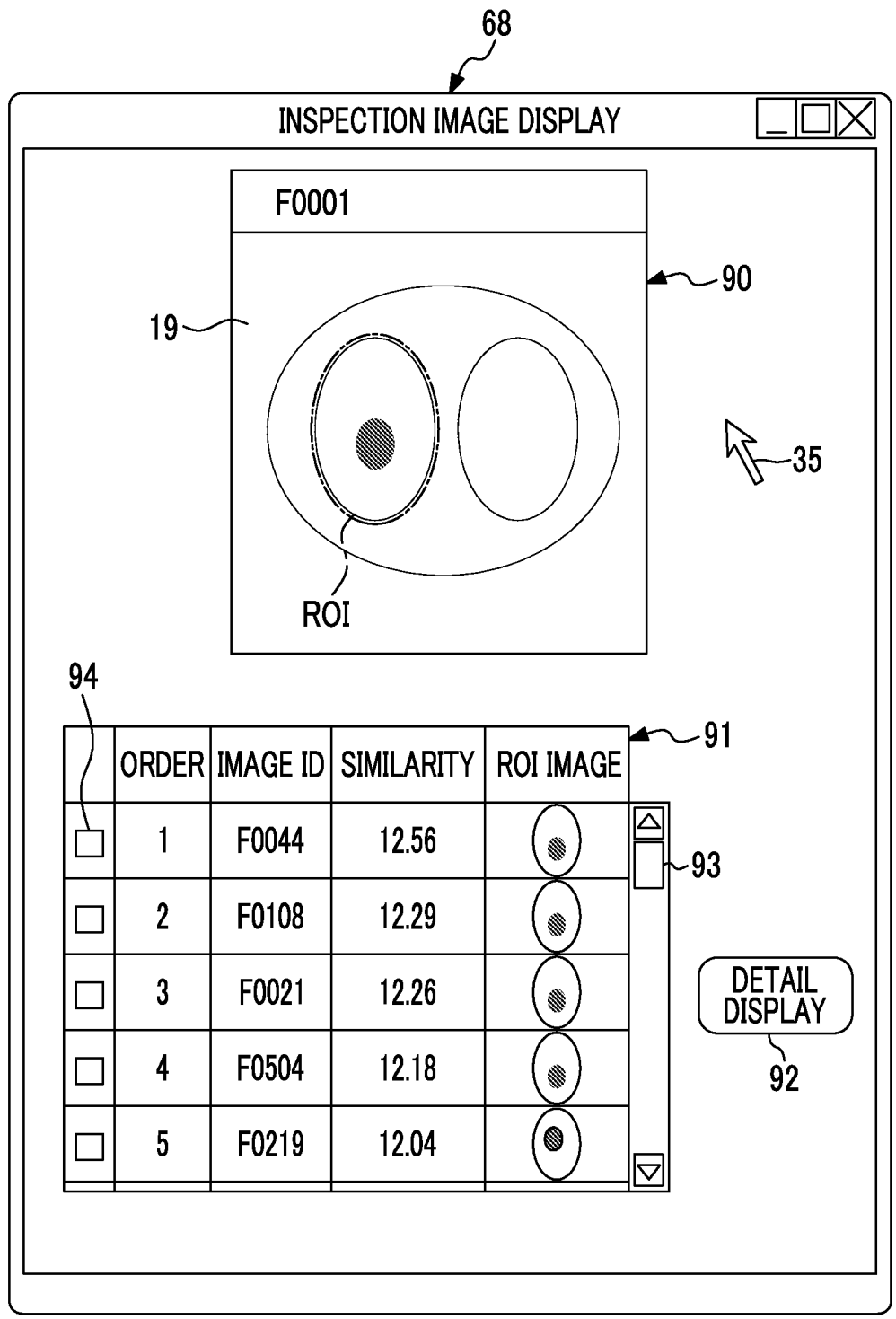
FIG. 14 is a diagram illustrating a retrieval result display window for displaying retrieval results of a similar image.

In FIG. 14, the retrieval result display window 68 includes an image display region 90 for displaying the inspection image 19 which is a retrieved image and the region of interest ROI designated in the inspection image display window 30, a retrieval result display region 91, and a detail display button 92. Some of contents (for example, cases up to the fifth order from above) of the list 67 are displayed on the retrieval result display region 91, and the display region can be moved vertically by a scroll bar 93 as necessary.

The retrieval result display region 91 is provided with a check box 94 for selecting each case of the list 67. In case where this check box 94 is selected and the detail display button 92 is selected, detailed information on the selected list 67, for example, the entirety of the case images 21 rather than the ROI image, supplementary information of the case image 21, particularly, a report ID of a radiographic interpretation report obtained by radiographically interpreting and creating the case image 21, and the like are displayed on a separate window from the retrieval result display window 68. The creation of this separate window and the transmission thereof to the diagnosis and treatment department terminal 12 are also performed by the output control unit 65 similarly to the retrieval result display window 68. The entirety of the case images 21 and the supplementary information can be fetched from the case image DB server 16 to the similar image retrieval server 17, on the basis of the image ID.

Hereinafter, the action of the similar image retrieval server 17 according to the above-mentioned configuration will be described with reference to FIGS. 15 and 16. First, the input device 50 is operated, and the similar image retrieval program 52 is started up. Thereby, the request receiving unit 60, the feature amount calculation unit 61, the probability calculation unit 62, the similarity calculation unit 63, the retrieval result output unit 64, and the output control unit 65 are constructed in the CPU 47, and a computer constituting the similar image retrieval server 17 functions as a similar image retrieval device.

A doctor inspects the inspection image 19 in the inspection image display window 30, and designates the region of interest ROI to select the similar image retrieval button 38 in case where a similar image to the inspection image 19 is desired to be acquired. Thereby, the request for the acquisition of a similar image which includes the inspection image 19 and to which the region information 25 is attached is transmitted to the similar image retrieval server 17.

As shown in step S100 of FIG. 15, in the similar image retrieval server 17, the request for the acquisition of a similar image from the diagnosis and treatment department terminal 12 is received in the communication unit 48, and is received in the request receiving unit 60. The inspection image 19 of the received request for the acquisition of a similar image and the region information 25 are stored in the storage device 45 by the request receiving unit 60.

The inspection image 19 and the region information 25 of the storage device 45 are read out to the feature amount calculation unit 61. The feature amount Zx of the region of interest ROI which is specified on the basis of the region information 25 is calculated by the feature amount calculation unit 61 (step S110). The feature amount Zx is output from the feature amount calculation unit 61 to the probability calculation unit 62.

Since a region in which the feature amount Zx is calculated is limited to a region of a portion of the inspection image 19 such as the region of interest ROI, a processing load is less applied to the calculation of the feature amount Zx than in a case where the entire inspection image 19 is set to a calculation target of the feature amount Zx. In addition, since a region in which a lesion is reflected is designated in the region of interest ROI, it is possible to calculate the feature amount Zx representing the feature of a lesion better than in a case where the feature amount Zx inclusive of a region other than a lesion is calculated.

The first existence probability Px which is a probability of the pattern of a lesion existing within the region of interest ROI of the inspection image 19 is calculated by the probability calculation unit 62 on the basis of the feature amount Zx from the feature amount calculation unit 61 (step S120). In this case, the calculation expression 66 created by a statistical method on the basis of the visual determination data 75 is used. The first existence probability Px is output from the probability calculation unit 62 to the similarity calculation unit 63.

The similarity S between the inspection image 19 and the case image 21 is calculated by the similarity calculation unit 63 on the basis of the first existence probability Px from the probability calculation unit 62 and the second existence probability Py which is affixed to case image 21 (step S130).

The second existence probability Py is previously calculated in the probability calculation unit 62 through a statistical method using the calculation expression 66, on the basis of the feature amount Zy of the region of interest ROI of the case image 21 which is calculated in the feature amount calculation unit 61 in the past diagnosis. Therefore, it is possible to save the time and effort to calculate the feature amount Zy and the second existence probability Py during the calculation of the similarity S, and to speed up a process of calculating the similarity S.

As shown in step S131 of FIG. 16 illustrating a procedure of calculating the similarity S, in the similarity calculation unit 63, the coexistence probability Pxy is calculated by the coexistence probability calculator 80, using Expression (2-A), on the basis of each of the existence probabilities Px and Py. In addition, the non-coexistence probability NPxy is calculated by the non-coexistence probability calculator 81, using Expression (3-A), on the basis of each of the existence probabilities Px and Py. The coexistence probability Pxy and the non-coexistence probability NPxy are output to the ratio calculator 82.

The ratio Pxy/NPxy of the coexistence probability Pxy to the non-coexistence probability NPxy is calculated by the ratio calculator 82 (step S132). The ratio Pxy/NPxy is output to the multiplier 83.

The total multiplication of the ratios Pxy/NPxy is calculated by the multiplier 83, as the similarity S, using Expression (4-A) (step S133). The similarity S is calculated with respect to all the case images 21 stored in the case image DB 22. The similarity S is output from the similarity calculation unit 63 to the retrieval result output unit 64.

Since the first existence probability Px is calculated using the calculation expression 66 created by a statistical method on the basis of the visual determination data 75, and the similarity S is calculated on the basis of the first existence probability Px and the second existence probability Py which is similarly calculated by a statistical method, a case does not occur in which the reliability of the similarity S is influenced by the calculation accuracy of the feature amounts Zx and Zy as in the related art. In addition, since the visual determination data 75 indicates results of a person such as a doctor having visually determined whether or not the pattern of a lesion exists, there may be no concern of the similarity S being estranged from a human appearance. Particularly, as in the present embodiment, in case where there are multiple types of feature amounts Zx and Zy, the calculation accuracy differs depending on the type, and the degree of estrangement from a human appearance also differs depending on the type. Thereby, the reliability of the similarity S has a greater tendency to be influenced by the calculation accuracy of the feature amounts Zx and Zy, but such a concern can be wiped away. Therefore, it is possible to provide a similar image having reliability to a doctor.

Further, a case does not occur in which the similarities S are the same as each other as in the related art in case where the feature amounts Zx and Zy are substantially coincident with each other in both large values, and in case where the feature amounts Zx and Zy are substantially coincident with each other in both low values. Specifically, in case where the feature amounts Zx and Zy are substantially coincident with each other in both large values, the coexistence probability Pxy becomes higher and the non-coexistence probability NPxy becomes lower, and thus the similarity S becomes higher. On the other hand, in case where the feature amounts Zx and Zy are substantially coincident with each other in both low values, the coexistence probability Pxy becomes lower and the non-coexistence probability NPxy becomes higher, and thus the similarity S becomes lower. Therefore, it is possible to calculate a similarity S which is coincident with an object of similar image retrieval to obtain a similar image to the inspection image 19, and to provide a similar image having a sense of consent to a doctor.

Since the coexistence probability Pxy, the non-coexistence probability NPxy, and the ratio Pxy/NPxy are calculated, the total multiplication of the ratios Pxy/NPxy is further calculated, and the calculation results are used as the similarity S, the similarity S covers both the coexistence probability Pxy and the non-coexistence probability NPxy, and thus it is possible to further enhance the reliability of the similarity S as an index indicating a similarity between the inspection image 19 and the case image 21.

In FIG. 15, the list 67 obtained by sorting a set of the similar image and the similarity S is created by the retrieval result output unit 64 in order of the similarity S, and the created list 67 is output from the retrieval result output unit 64 to the output control unit 65 (step S140).

The retrieval result display window 68 is created by the output control unit 65 on the basis of the list 67, and the retrieval result display window 68 and information of the diagnosis and treatment department terminal 12 that makes a request for the acquisition of a similar image are output to the communication unit 48 (step S150). Thereby, the retrieval result display window 68 is transmitted to the diagnosis and treatment department terminal 12 that makes a request for the acquisition of a similar image through the communication unit 48. A doctor inspects the retrieval result display window 68, and a definitive diagnosis is made with reference thereto.

Since the list 67 is created to thereby create the retrieval result display window 68 on the basis thereof, and the retrieval result display window 68 is submitted for a doctor's inspection. Therefore, it is possible to provide a promising clue in order for a doctor to make a definitive diagnosis, and to perform a diagnosis having higher accuracy for even a less-experienced doctor to make.

Meanwhile, in case where there is one feature amount Zx, the multiplier 83 is not required, and the similarity calculation unit 63 outputs the ratio Pxy/NPxy of the coexistence probability Pxy to the non-coexistence probability NPxy, as the similarity S. Alternatively, either the coexistence probability Pxy or the non-coexistence probability NPxy may be output as the similarity S. In this case, either the coexistence probability calculator 80 or the non-coexistence probability calculator 81, and the ratio calculator 82 are not required.

Even in case where there are multiple types of feature amounts Zx, either the total multiplication (ΠPxy) of the coexistence probabilities Pxy or the total multiplication (ΠNPxy) of the non-coexistence probabilities NPxy, rather than the total multiplication of the ratios Pxy/NPxy of the coexistence probability Pxy to the non-coexistence probability NPxy, may be output as the similarity S.

The above-mentioned first embodiment will be described by way of example. The similarity S is calculated using the following Expression (4-B) in case where the total multiplication of the coexistence probabilities Pxy is set to the similarity S, and using the following Expression (4-C) in case where the total multiplication of the non-coexistence probabilities NPxy is set to the similarity S.

$$S=\Pi Pxy=PxyA \times PxyB \times PxyC \times PxyD \times PxyE \times PxyF \times PxyG \times PxyH \quad (4\text{-B})$$

$$S=\Pi NPxy=NPxyA \times NPxyB \times NPxyC \times NPxyD \times NPxyE \times NPxyF \times NPxyG \times NPxyH \quad (4\text{-C})$$

Since the coexistence probability Pxy and the non-coexistence probability NPxy are indexes indicating the similarity and non-similarity between the inspection image 19 and the case image 21, these probabilities themselves or the total multiplication of these probabilities may be allowed to be set to the similarity S instead of the total multiplication of the ratios Pxy/NPxy of the coexistence probability Pxy to the non-coexistence probability NPxy. The same is true of a case where the ratio Pxy/NPxy of the coexistence probability Pxy to the non-coexistence probability NPxy is set to the similarity S. Meanwhile, in case where the non-coexistence probability NPxy or the total multiplication of the non-coexistence probabilities is set to the similarity S, it is indicated that the similarity between the inspection image 19 and the case image 21 becomes higher as the value becomes lower, reversely to a case where the coexistence probability Pxy or the total multiplication of the coexistence probabilities, and the ratio Pxy/NPxy or the total multiplication of the ratios are set to the similarity S.

In addition, instead of the total multiplication of the coexistence probabilities Pxy, the total multiplication of the non-coexistence probabilities NPxy, or the total multiplication of the ratios Pxy/NPxy of the coexistence probability Pxy to the non-coexistence probability NPxy, the logarithmic sum ($\Sigma$ log Pxy) of the coexistence probabilities Pxy, the logarithmic sum ($\Sigma$ log NPxy) of the non-coexistence probabilities NPxy, or the logarithmic sum ($\Sigma$ log(Pxy/NPxy)) of the ratios Pxy/NPxy of the coexistence probability Pxy to the non-coexistence probability NPxy may be output as the similarity S. In this case, a logarithmic adder is provided instead of the multiplier 83.

The above-mentioned first embodiment will be described again by way of example. The similarity S is calculated using the following expression (4-D) in case where the logarithmic sum of the coexistence probabilities Pxy is set to the similarity S, using the following expression (4-E) in case where the logarithmic sum of the non-coexistence probabilities NPxy is set to the similarity S, and using the following expression (4-F) in case where the logarithmic sum of the ratios Pxy/NPxy of the coexistence probability Pxy to the non-coexistence probability NPxy is set to the similarity S, respectively.

$$S=\Sigma \log Pxy = \log PxyA + \log PxyB + \log PxyC + \log PxyD + \log PxyE + \log PxyF + \log PxyG + \log PxyH \quad (4\text{-}D)$$

$$S=\Sigma \log NPxy = \log NPxyA + \log NPxyB + \log NPxyC + \log NPxyD + \log NPxyE + \log NPxyF + \log NPxyG + \log NPxyH \quad (4\text{-}E)$$

$$S=\Sigma \log(Pxy/NPxy) = \Sigma(\log Pxy - \log NPxy) = (\log PxyA - \log NPxyA) + (\log PxyB - \log NPxyB) + (\log PxyC - \log NPxyC) + (\log PxyD - \log NPxyD) + (\log PxyE - \log NPxyE) + (\log PxyF - \log NPxyF) + (\log PxyG - \log NPxyG) + (\log PxyH - \log NPxyH) \quad (4\text{-}F)$$

The logarithmic sum of the coexistence probabilities Pxy, the logarithmic sum of the non-coexistence probabilities NPxy, and the logarithmic sum of the ratios Pxy/NPxy of the coexistence probability Pxy to the non-coexistence probability NPxy are indexes indicating the similarity between the inspection image 19 and the case image 21 similarly to the total multiplication thereof. It can be said that in cases of the logarithmic sum of the coexistence probabilities Pxy and the logarithmic sum of the ratios Pxy/NPxy of the coexistence probability Pxy to the non-coexistence probability NPxy, the similarity between the inspection image 19 and the case image 21 becomes higher as the value becomes higher, and it can be said that in a case of the logarithmic sum of the non-coexistence probabilities NPxy, reversely, the similarity between the inspection image 19 and the case image 21 becomes higher as the value becomes lower.

In the above-mentioned first embodiment, a description has been given in which the feature amount Zy and the second existence probability Py of the case image 21 are previously calculated in the feature amount calculation unit 61 and the probability calculation unit 62, but the feature amount Zy or the second existence probability Py of the case image 21 may be calculated in a separate device from the similar image retrieval server 17. In this case, the second existence probability Py may be calculated by the same statistical method as that in the first existence probability Px, and the second existence probability Py may be calculated by a separate statistical method from that in the first existence probability Px. In addition, a description has been given in which the second existence probability Py which has been previously calculated is stored in the case image DB 22, as the supplementary information of the case image 21, but the second existence probability Py may be calculated whenever the similarity S is calculated. In this manner, since the second existence probability Py is not required to be stored in the case image DB 22, it is possible to afford to secure the capacity of the case image DB 22 to that extent, and to store a greater number of case images 21.

Second Embodiment

As in the above-mentioned first embodiment, in case where Expression (2-A) is used in the calculation of the coexistence probability Pxy, the coexistence probability Pxy each of the second existence probabilities Py in case where the first existence probability Px is set to, for example, 0.8 is as shown in FIG. 17A. That is, as the second existence probability Py increases, the coexistence probability Pxy becomes higher, and the similarity between the inspection image 19 and the case image 21 also becomes higher.

Here, since the respective existence probabilities Px and Py are calculated so as to be the same as each other by a statistical method, it can be said that in case where the values of the respective existence probabilities Px and Py becomes closer to each other, the similarity between the inspection image 19 and the case image 21 becomes higher. Furthermore, in case where both values of the respective existence probabilities Px and Py are high and are the same as each other, it can be said that the inspection image 19 and the case image 21 are substantially coincident with each other. It can be said that the same is substantially true of the respective feature amounts Zx and Zy which are origins of the respective existence probabilities Px and Py. That is, it may be said that in case where the values of the respective feature amounts Zx and Zy become closer to each other depending on the values or ranges of the respective feature amounts Zx and Zy, the similarity between the inspection image 19 and the case image 21 becomes higher. Particularly, in case where both the values of the respective feature amounts Zx and Zy are large and close to each other, there is a high possibility of the similarity between the inspection image 19 and the case image 21 becoming higher. In this manner, in case where the similarity between the inspection image 19 and the case image 21 in consideration of the respective existence probabilities Px and Py and the closeness of the values of their original respective feature amounts Zx and Zy, a more appropriate similar image can be retrieved. However, in the example shown in FIG. 17A, since the similarity between the inspection image 19 and the case image 21 is not determined in consideration of the respective existence probabilities Px and Py and the closeness of the values of the respective feature amounts Zx and Zy, the coexistence probability Pxy in case where the second existence probability Py is 0.8 which is the same as the first existence probability Px is 0.64, and has a value lower than the coexistence probability Pxy (0.8) in case where the second existence probability Py is 1.0 and the coexistence probability Pxy (0.72) in case where the second existence probability Py is 0.9. For this reason, in case where the second existence probability Py is 0.8, it is determined that the similarity becomes lower than in a case where the second existence probability Py is 1.0 and 0.9 in spite of the similarity between inspection image 19 and the case image 21 becoming higher.

Consequently, in the present embodiment, the similarity between the inspection image 19 and the case image 21 is determined in consideration of the closeness of the values of the respective existence probabilities Px and Py, and the coexistence probability Pxy is calculated so that the case image 21 having a higher similarity with respect to the inspection image 19 is appropriately determined. Specifically, the coexistence probability Pxy is calculated by the following expression (2-B).

$$Pxy = Px \times \min(Px, Py) \quad (2\text{-}B)$$

The item min(Px, Py) of Expression (2-B) on the right side means a minimum value of the respective existence probabilities Px and Py, that is, a lower value of the respective existence probabilities Px and Py. In case where the respective existence probabilities Px and Py have the same value, the relation of min(Px, Py)=Px=Py is established. In case where Expression (2-B) is used, the coexistence probability Pxy for each of the second existence probabilities Py in case where the first existence probability Px is set to 0.8, similarly to FIG. 17A, is as shown in FIG. 17B. That is, in case where the second existence probability Py is 0.8, and in case where the second existence probability Py is 1.0 and 0.9, the coexistence probability Pxy is set to a value of 0.64. Therefore, in case where the respective existence probabilities Px and Py have the same value, it can be determined that the inspection image 19 and the case image 21 have the same similarity as in a case where the second existence probability Py is higher than the first existence probability Px.

Similarly to the coexistence probability Pxy, it can be determined that the similarity between the inspection image 19 and the case image 21 becomes higher in case where the respective existence probabilities Px and Py have the same value, and thus the non-coexistence probability NPxy is calculated by the following expressions (3-B) and (3-C).

$$\text{In case where } Px > 0.5, NPxy = Px \times \{1 - \min(Px, Py)\} \pm (1-Px) \times Py \quad (3\text{-}B)$$

$$\text{In case where } Px \leq 0.5, NPxy = Px \times (1-Py) + (1-Px) \times \max(Px, Py) \quad (3\text{-}C)$$

The item max(Px, Py) of Expression (3-C) on the right side means a maximum value of the respective existence probabilities Px and Py, that is, a higher value of the respective existence probabilities Px and Py. In case where the respective existence probabilities Px and Py have the same value, the relation of max(Px, Py)=Px=Py is established.

FIGS. 18A and 18B illustrate the non-coexistence probabilities NPxy for each of the second existence probabilities Py in case where the first existence probability Px is set to 0.8 (corresponding to a case of Px>0.5), respectively, in a case where Expression (3-A) and Expression (3-B) of the above-mentioned first embodiment are used. In FIG. 18A using Expression (3-A), the non-coexistence probability NPxy is lowest in case where the second existence probability Py is 1.0, and the similarity between the inspection image 19 and the case image 21 is also highest. On the other hand, in FIG. 18B using Expression (3-B), the non-coexistence probability NPxy is lowest in case where the second existence probability Py is 0.8 which is the same as the first existence probability Px, and the similarity between the inspection image 19 and the case image 21 is also highest.

In addition, FIGS. 19A and 19B illustrate the non-coexistence probabilities NPxy for each of the second existence probabilities Py in case where the first existence probability Px is set to 0.3 (corresponding to a case of Px≤0.5), respectively, in a case where Expression (3-A) of the above-mentioned first embodiment and Expression (3-C) are used. In FIG. 19A using Expression (3-A), the non-coexistence probability NPxy is lowest in case where the second existence probability Py is 0.1, and the similarity between the inspection image 19 and the case image 21 is also highest. On the other hand, in FIG. 19B using Expression (3-C), the non-coexistence probability NPxy is lowest in case where the second existence probability Py is 0.3 which is the same as the first existence probability Px, and the similarity between the inspection image 19 and the case image 21 is also highest. Therefore, in case where the respective existence probabilities Px and Py have the same value, it can be determined that the similarity between the inspection image 19 and the case image 21 is highest.

Third Embodiment

In the above-mentioned first embodiment, the similarity S between the inspection image 19 and each of all the case images 21 stored in the case image DB 22 is calculated. For this reason, there are a relatively large number of case images 21, a lot of time is taken until retrieval results are output.

Consequently, in the present embodiment, the case image 21 which obviously has no similarity with respect to the inspection image 19 is excluded from a calculation target of the similarity S, and thus time taken to output retrieval results is shortened.

Figure 20:
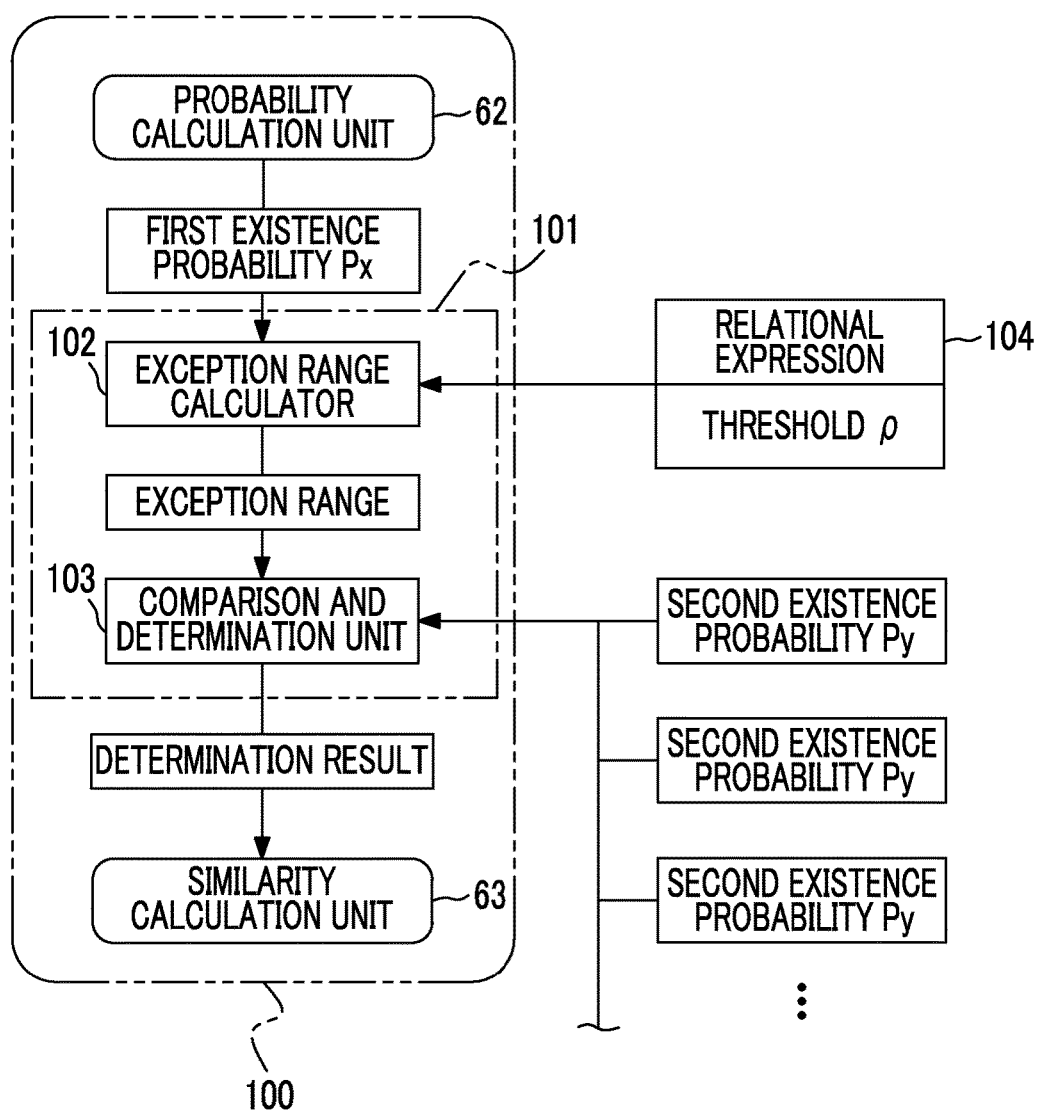
FIG. 20 is a block diagram illustrating a function of a CPU of a similar image retrieval server according to a third embodiment in which a filtering unit is constructed.

In FIG. 20, a filtering unit 101 is constructed in a CPU 100 of the similar image retrieval server 17 of the present embodiment, in addition to the respective units 60 to 65 (components other than the probability calculation unit 62 and the similarity calculation unit 63 are not shown in the drawing) of the above-mentioned first embodiment. The filtering unit 101 includes an exclusion range calculator 102 and a comparison and determination unit 103. The exclusion range calculator 102 calculates an exclusion range of the second existence probability Py from a relational expression 104 and a threshold p. The exclusion range calculator 102 outputs the calculated exclusion range to the comparison and determination unit 103.

The comparison and determination unit 103 compares the exclusion range from the exclusion range calculator 102 with the second existence probability Py affixed to the case image 21 from the case image DB server 16. The comparison and determination unit 103 excludes the case image 21 in which the second existence probability Py is in the exclusion range, from candidates for calculating the similarity S in the similarity calculation unit 63. Specifically, the comparison and determination unit 103 outputs information such as an image ID of the case image 21 in which the second existence probability Py is in the exclusion range, as determination results, to the similarity calculation unit 63. The similarity calculation unit 63 calculates the similarity S on the basis of determination results from the comparison and determination unit 103, with the exception of the case image 21 in which the second existence probability Py is in the exclusion range.

The relational expression 104 which is given to the exclusion range calculation unit 102 is, for example, shown below.

A difference NPxy−Pxy between the coexistence probability Pxy and the non-coexistence probability NPxy shows a non-similarity between the inspection image 19 and the case image 21. As shown in Expression (5), in case where this difference is larger than the threshold ρ, that is, in case where the non-similarity between the inspection image 19 and the case image 21 is relatively high, it can be determined that the similarity between the inspection image 19 and the case image 21 becomes lower without calculating the similarity S.

$$NPxy-Pxy>\rho \quad (5)$$

In case where Expression (2-A) and Expression (3-A) are substituted into Expression (5) to find a solution for the second existence probability Py, the following expression (6) is established.

$$Py>(\rho-Px)/(1-3Px) \quad (6)$$

Expression (6) is indefinite in case where Px=1/3. Since the denominator of the right side is positive in case where Px<⅓, and the denominator of the right side is negative in case where Px>⅓, the following Expressions (7-A) and (7-B) are established in case where Px<⅓ and Px>⅓, respectively.

$$\text{In case where } Px<⅓, Py>(\rho-Px)/(1-3Px) \quad (7\text{-}A)$$

$$\text{In case where } Px>⅓, Py<(\rho-Px)/(1-3Px) \quad (7\text{-}B)$$

Expression (7-A) and (7-B) are adopted as the relational expression 104.

The exclusion range calculation unit 102 calculates an exclusion range by substituting the values of the threshold ρ and the first existence probability Px into Expressions (7-A) and (7-B). the threshold ρ is set in advance, and is input through the input device 50. The first existence probability Px is provided from the probability calculation unit 62. For example, in case where threshold ρ=0.6 and the first existence probability Px=0.8 (corresponding to a case of Px>⅓), the exclusion range of the second existence probability Py is as follows from Expression (7-B).

In case where Py<(0.6−0.8)/(1−3·0.8)≈0.143, the comparison and determination unit 103 excludes the case image 21 in which the second existence probability Py is lower than 0.143, from calculation candidates of the similarity S.

In addition, in case where threshold ρ=0.6 and the first existence probability Px=0.1 (corresponding to a case of Px<⅓), the exclusion range of the second existence probability Py is as follows from Expression (7-A).

$$Py>(0.6-0.1)/(1-3\cdot0.1)\approx0.714$$

In this case, the comparison and determination unit 103 excludes the case image 21 in which the second existence probability Py is higher than 0.714, from the calculation candidates of the similarity S.

Meanwhile, although not shown in the drawing, similarly to each of the feature amount calculators 61A to 61H, each of the coexistence probability calculators 80A to 80H, each of the non-coexistence probability calculators 81A to 81H, and each of the ratio calculators 82A to 82H, the exclusion range calculator 102 and the comparison and determination unit 103 are provided with a plurality of calculators corresponding to multiple types of lesion. The exclusion range calculation unit 102 calculates exclusion ranges of second existence probabilities PyA, PyB, PyC, . . . corresponding to the patterns of various lesions, and the comparison and determination unit 103 compares the exclusion ranges corresponding to the patterns of various types of lesion with the second existence probabilities PyA, PyB, PyC, . . . corresponding to the patterns of various lesions. Even in case where just one of the second existence probabilities PyA, PyB, PyC, . . . corresponding to the patterns of various lesions is in the exclusion range, the comparison and determination unit 103 excludes the case image 21 from the calculation candidates of the similarity S.

The relational expression 104 which is given to the exclusion range calculation unit 102 is one type, and the value of the first existence probability Px to be substituted differs depending on the type of the pattern of a lesion. In addition, the threshold ρ may have the same value regardless of the type of the pattern of a lesion, and may be changed depending on the type of the pattern of a lesion.

Since the case image 21 in which the second existence probability Py is in the exclusion range is excluded from the calculation candidates of the similarity S, it is possible to speed up a process of calculating the similarity S.

Expressions (7-A) and (7-B) obtained by substituting Expression (2-A) and Expression (3-A) into Expression (5) are given to the exclusion range calculator 102 as the relational expression 104, but the relational expression obtained by substituting Expression (2-B) and Expressions (3-B) and (3-C) into Expression (5) may be given to the exclusion range calculator 102. In addition, simply, the exclusion range may be set with respect to the absolute value |Px−Py| of the difference between the first existence probability Px and the second existence probability Py. For example, the case image 21 of the second existence probability Py satisfying the relation of |Px−Py|>0.5 is excluded from the calculation candidates of the similarity S.

In each of the embodiments, the similar image retrieval device of the present invention has been described in terms of the configuration of the similar image retrieval server 17 that performs similar image retrieval, on the basis of the request for the acquisition of a similar image from the diagnosis and treatment department terminal 12, but the similar image retrieval server 17 may be shut down to cause the diagnosis and treatment department terminal 12 to take charge of a function of the similar image retrieval device. In this case, each of the unit 61 to 65 other than the request receiving unit 60 is constructed in the CPU of the diagnosis and treatment department terminal 12, and the diagnosis and treatment department terminal 12 has access to the case image DB server 16 or the like and performs process of retrieving similar images.

The inspection image DB server 15, the case image DB server 16, and the similar image retrieval server 17 are constituted by separate servers as in each of the embodiments, and may be integrated into one server.

The hardware configuration of a computer system can be modified variously. For example, for the purpose of an improvement in processing capability or reliability, the similar image retrieval server 17 can also be constituted by a plurality of server computers separated from each other as hardware. Specifically, the feature amount calculation unit 61, the probability calculation unit 62, and the similarity calculation unit 63 are dispersed to three server computers which are caused to take charge of the calculation units. In this manner, the hardware configuration of the computer system can be appropriately changed in accordance with required performance such as processing capability, safety, or reliability. Further, without being limited to hardware, an application program such as the similar image retrieval program 52 can be, of course, duplicated or dispersed to a plurality of storage devices and stored therein, for the purpose of the securing of safety or reliability.

In each of the embodiments, the medical information system 2 constructed in medical facilities has been illustrated, and a description has been given in terms of a configuration in which the similar image retrieval server 17 is used within one medical facility, but a configuration in which the similar image retrieval server 17 available to a plurality of medical facilities may be constructed.

In each of the embodiments, the similar image retrieval server 17 is configured such client terminals such as the diagnosis and treatment department terminal 12 which are installed in one medical facility are communicably connected thereto through a LAN, and that an application service such as similar image retrieval is provided in accordance with a request from the client terminal. In order to be capable of using this terminal in a plurality of medical facilities, the similar image retrieval server 17 is communicably connected to each client terminal which is installed in a plurality of medical facilities through a WAN (Wide Area Network) such as, for example, the Internet or a public communication network. A request from each client terminal in a plurality of medical facilities is received in the similar image retrieval server 17 through a WAN such as the Internet or a public communication network, and each client terminal is provided with an application service of similar image retrieval. Meanwhile, in case where a WAN is used, it is preferable to construct a VPN (Virtual Private Network), or to use communication protocol, such as HTTPS (Hypertext Transfer Protocol Secure), having a high security level, in consideration of information security.

An installation location and an operating main body of the similar image retrieval server 17 in this case may be data center which is managed by, for example, a separate company from medical facilities, and may be one of a plurality of medical facilities.

The present invention is not limited to each of the embodiments, and various configurations can be of course adopted without departing from the spirit and scope of the present invention. For example, the number of inspection images 19 included as a retrieved image in a request for the acquisition of a similar image may be one or plural. In case where the number is plural, the region information 25 is attached for each inspection image 19.

A plurality of regions of interest ROI may be designated with respect to one inspection image 19 or one case image 21. In this case, each of the feature amounts Zx and Zy, each of the existence probabilities Px and Py, and the similarity S are calculated with respect to the plurality of regions of interest ROI designated, and retrieval results are also output for each of the plurality of regions of interest ROI in distinction from each other. In addition, the region of interest ROI may be manually designated by a doctor as in each of the embodiments, and the region of interest ROI may be automatically designated by analyzing the inspection image 19.

Further, the inspection image may be an image captured by other modalities such as an ultrasonic probe, an electronic endoscope, or mammography.

In each of the embodiments, a request for the acquisition of similar images including the entirety of the inspection images 19 and the region information 25 is received in the similar image retrieval server 17, but a request for the acquisition of a similar image including an ROI image obtained by cutting out the region of interest ROI of the inspection image 19, instead of the entirety of the inspection images 19 and the region information 25, may be transmitted from the diagnosis and treatment department terminal 12 to the similar image retrieval server 17. In this case, it is not necessary to include the region information 25 in a request for the acquisition of a similar image. In this manner, the retrieved image may be the entirety of the inspection images 19, and may be an image obtained by cutting out a region of a portion of the inspection image 19.

In each of the embodiments, the inspection image 19 as a retrieved image, the case image 21 as an instance image, and the pattern of a lesion as a pattern are illustrated, but the present invention is not limited thereto. The retrieved image and the instance image may be an arbitrary image such as an image captured by a digital camera, and the pattern may be an arbitrary pattern such as a part of a face.

The above-mentioned various embodiments and various modified examples can also be appropriately combined. In addition, the present invention also covers a non-transitory computer readable recording medium a program stored thereon, in addition to a program.

What is claimed is:

1. A similar image retrieval device that retrieves a similar image which is similar to a retrieved image from a plurality of instance images, comprising:
a processor configured to,
calculate a feature amount corresponding to a pattern, registered in advance, by analyzing the retrieved image,
calculate a first existence probability of the pattern existing within the retrieved image as an absolute value between 0 to 1, through a statistical method, on the basis of the feature amount, and
calculate a similarity between the retrieved image and each of the plurality of instance images, on the basis of the first existence probability and a second existence probability of the pattern existing within the instance images which is calculated with respect to the plurality of instance images,
wherein the processor calculates at least one of a coexistence probability of the pattern existing in both the instance image and the retrieved image, and a non-coexistence probability of the pattern independently existing in only one of the instance image and the retrieved image, on the basis of the first existence probability and the second existence probability.

2. The similar image retrieval device according to claim 1, wherein the processor uses a calculation expression for calculating the first existence probability, created in advance by the statistical method, using the feature amount as a variable, on the basis of a relationship between the presence or absence of the pattern within an image for learning visually determined by a person and the feature amount.

3. The similar image retrieval device according to claim 1, wherein the processor calculates the coexistence probability or the non-coexistence probability, as the similarity, and
determines that a similarity between the instance image and the retrieved image becomes higher as the coexistence probability increases, or determines that a similarity between the instance image and the retrieved image becomes lower as the non-coexistence probability increases.

4. The similar image retrieval device according to claim 1, wherein the processor calculates a ratio of the coexistence probability to the non-coexistence probability, as the similarity, and
determines that a similarity between the instance image and the retrieved image becomes higher as the ratio becomes higher.

5. The similar image retrieval device according to claim 1, wherein the pattern has multiple types, and
the processor calculates the coexistence probability or the non-coexistence probability of each of the multiple types of patterns,
calculates a total multiplication of the calculated coexistence probabilities or a logarithmic sum of the calculated coexistence probabilities, or a total multiplication of the calculated non-coexistence probabilities or a logarithmic sum of the calculated non-coexistence probabilities, as the similarity, and
determines that a similarity between the instance image and the retrieved image becomes higher as the total multiplication of the coexistence probabilities or the logarithmic sum of the coexistence probabilities increases, or determines that a similarity between the instance image and the retrieved image becomes lower as the total multiplication of the non-coexistence probabilities or the logarithmic sum of the non-coexistence probabilities increases.

6. The similar image retrieval device according to claim 1, wherein the pattern has multiple types, and
the processor calculates a ratio of the coexistence probability to the non-coexistence probability of each of the multiple types of patterns,
calculates a total multiplication of the calculated ratios or a logarithmic sum of the ratios, as the similarity, and
determines that a similarity between the instance image and the retrieved image becomes higher as the total multiplication of the ratios or the logarithmic sum of the ratios increases.

7. The similar image retrieval device according to claim 1, wherein in case where the first existence probability is set to Px, the second existence probability is set to Py, and the coexistence probability is set to Pxy,
a relation of Pxy=Px×Py is established.

8. The similar image retrieval device according to claim 1, wherein in case where the first existence probability is set to Px, the second existence probability is set to Py, and the non-coexistence probability is set to NPxy,
a relation of NPxy=Px×(1−Py)+(1−Px)×Py is established.

9. The similar image retrieval device according to claim 1, wherein in case where the first existence probability is set to Px, the second existence probability is set to Py, a minimum value of Px and Py is set to min(Px, Py), and the coexistence probability is set to Pxy,
a relation of Pxy=Px×min(Px, Py) is established.

10. The similar image retrieval device according to claim 1, wherein in case where the first existence probability is set to Px, the second existence probability is set to Py, a minimum value of Px and Py is set to min(Px, Py), a maximum value of Px and Py is set to max(Px, Py), and the non-coexistence probability is set to NPxy,
in case where Px>0.5, a relation of NPxy=Px×{1−min(Px, Py)}+(1−Px)×Py is established, and
in case where Px≤0.5, a relation of NPxy=Px×(1−Py)+(1−Px)×max(Px, Py) is established.

11. The similar image retrieval device according to claim 1, wherein the processor compares an exclusion range of the second existence probability with the second existence probability, and excludes the instance image in which the second existence probability is in the exclusion range, from candidates for calculating the similarity in the processor.

12. The similar image retrieval device according to claim 11, wherein the processor calculates the exclusion range from a relational expression between the first existence probability and the second existence probability in which the first existence probability is used as a variable.

13. The similar image retrieval device according to claim 1, wherein the processor calculates the feature amount of a region of a portion of the retrieved image.

14. The similar image retrieval device according to claim 1, wherein the processor further calculates a feature amount of the instance image.

15. The similar image retrieval device according to claim 1, wherein the processor further calculates the second existence probability.

16. The similar image retrieval device according to claim 1, wherein the processor outputs a set of the similar image and the similarity, as a retrieval result of the similar image.

17. The similar image retrieval device according to claim 16, wherein the processor outputs a list obtained by sorting a set of a plurality of the similar images and the similarity in order of the similarity.

18. The similar image retrieval device according to claim 1, wherein the retrieved image is an inspection image which is used for a diagnosis in a patient, the instance image is a case image which is the inspection image used for a diagnosis in the past, and the pattern is a pattern of a lesion indicating a symptom of the patient's disease.

19. A method of operating a similar image retrieval device, using a computer, which retrieves a similar image which is similar to a retrieved image from a plurality of instance images, comprising:
a feature amount calculation step of causing a processor to calculate a feature amount corresponding to a pattern, registered in advance, by analyzing the retrieved image;
a probability calculation step of causing the processor to calculate a first existence probability of the pattern existing within the retrieved image as an absolute value between 0 to 1, through a statistical method, on the basis of the feature amount calculated in the feature amount calculation step; and
a similarity calculation step of causing the processor to calculate a similarity between the retrieved image and each of the plurality of instance images, on the basis of the first existence probability calculate in the probability calculation step and a second existence probability of the pattern existing in the instance image which is calculated with respect to the plurality of instance images,
wherein the processor calculates at least one of a coexistence probability of the pattern existing in both the instance image and the retrieved image, and a non-coexistence probability of the pattern independently existing in only one of the instance image and the retrieved image, on the basis of the first existence probability and the second existence probability.

20. A non-transitory computer readable recording medium having a similar image retrieval program recorded thereon, the program for retrieving a similar image which is similar to a retrieved image from a plurality of instance images, the medium causing a computer to execute:
a feature amount calculation function of calculating a feature amount corresponding to a pattern, registered in advance, by analyzing the retrieved image;
a probability calculation function of calculating a first existence probability of the pattern existing within the retrieved image as an absolute value between 0 to 1, through a statistical method, on the basis of the feature amount calculated in the feature amount calculation function; and a similarity calculation function of calculating a similarity between the retrieved image and each of the plurality of instance images, on the basis of the first existence probability calculated in the probability calculation function and a second existence probability of the pattern existing within the instance image which is calculated with respect to the plurality of instance images, wherein calculating at least one of a coexistence probability of the pattern existing in both the instance image and the retrieved image, and a non-coexistence probability of the pattern independently existing in only one of the instance image and the retrieved image, on the basis of the first existence probability and the second existence probability.

* * * * *